(12) United States Patent
Basu Mallick et al.

(10) Patent No.: US 10,743,155 B2
(45) Date of Patent: Aug. 11, 2020

(54) MECHANISM FOR QOS IMPLEMENTATION IN VEHICULAR COMMUNICATION

(71) Applicant: Panasonic Intellectual Property Corporation of America, Torrance, CA (US)

(72) Inventors: Prateek Basu Mallick, Hessen (DE); Joachim Loehr, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 43 days.

(21) Appl. No.: 16/300,450

(22) PCT Filed: Feb. 15, 2017

(86) PCT No.: PCT/EP2017/053381
§ 371 (c)(1),
(2) Date: Nov. 9, 2018

(87) PCT Pub. No.: WO2017/194212
PCT Pub. Date: Nov. 16, 2017

(65) Prior Publication Data
US 2019/0182639 A1    Jun. 13, 2019

(30) Foreign Application Priority Data
May 13, 2016   (EP) ..................... 16169663

(51) Int. Cl.
*H04W 4/40*    (2018.01)
*H04W 72/14*    (2009.01)
(Continued)

(52) U.S. Cl.
CPC ............. *H04W 4/40* (2018.02); *H04W 8/24* (2013.01); *H04W 28/0278* (2013.01);
(Continued)

(58) Field of Classification Search
CPC ........... H04W 4/40; H04W 4/44; H04W 4/46; H04W 8/24; H04W 28/0278;
(Continued)

(56) References Cited

U.S. PATENT DOCUMENTS 9,363,827 B2 * 6/2016 Li ..................... H04W 76/14
10,212,102 B2 * 2/2019 Lee .................. H04W 4/40
(Continued)

OTHER PUBLICATIONS

Sony Corporation, Necessary PC5 enhancements for V2X Services, Oct. 9, 2015, 3GPP, 3GPP TSG RAN WG1 Meeting #82bis, Tdoc: R1-155623 (Year: 2015).*
(Continued)

*Primary Examiner* — Eric Nowlin
(74) *Attorney, Agent, or Firm* — Seed IP Law Group LLP

(57) ABSTRACT

The disclosure relates to an improved vehicular UE for transmitting vehicular data and other data to one or more receiving entities. The vehicular UE receives an uplink grant from a radio base station controlling the cell to which the vehicular mobile terminal is attached, wherein the uplink grant indicates radio resources usable by the vehicular mobile terminal to transmit the vehicular data and/or the other data. The vehicular UE transmits the vehicular data and/or the other data using the radio resources indicated in the uplink grant. The vehicular mobile terminal handles the vehicular data and the other data separately from one another.

18 Claims, 7 Drawing Sheets

(51) Int. Cl.
  *H04W 72/04* (2009.01)
  *H04W 8/24* (2009.01)
  *H04W 80/02* (2009.01)
  *H04W 76/11* (2018.01)
  *H04W 72/10* (2009.01)
  *H04W 28/02* (2009.01)
  *H04W 76/27* (2018.01)

(52) U.S. Cl.
  CPC ....... *H04W 72/042* (2013.01); *H04W 72/048* (2013.01); *H04W 72/10* (2013.01); *H04W 72/14* (2013.01); *H04W 76/11* (2018.02); *H04W 80/02* (2013.01); *H04W 76/27* (2018.02)

(58) Field of Classification Search
  CPC . H04W 72/042; H04W 72/048; H04W 72/10; H04W 72/1242; H04W 72/14; H04W 76/11; H04W 76/27; H04W 80/02
  See application file for complete search history.

(56) References Cited

U.S. PATENT DOCUMENTS

| | | | |
|---|---|---|---|
| 10,334,598 B2* | 6/2019 | Loehr | H04W 72/1273 |
| 10,484,848 B2* | 11/2019 | Cavalcanti | H04W 4/046 |
| 10,505,783 B2* | 12/2019 | Chun | H04W 28/065 |
| 10,555,230 B2* | 2/2020 | Li | H04W 74/0816 |
| 2009/0296680 A1 | 12/2009 | Suzuki et al. | |
| 2015/0282210 A1* | 10/2015 | Li | H04W 74/0833 455/436 |
| 2016/0037510 A1* | 2/2016 | Park | H04W 28/0278 370/329 |
| 2017/0272384 A1* | 9/2017 | Lee | H04W 4/40 |
| 2018/0132208 A1* | 5/2018 | Pan | H04W 4/06 |
| 2018/0191551 A1* | 7/2018 | Chun | H04W 76/20 |
| 2018/0206089 A1* | 7/2018 | Cavalcanti | H04W 4/046 |
| 2018/0310308 A1* | 10/2018 | Loehr | H04W 72/06 |
| 2019/0045521 A1* | 2/2019 | Hong | H04W 72/042 |
| 2019/0059019 A1* | 2/2019 | Wallentin | H04W 40/12 |
| 2019/0124015 A1* | 4/2019 | Loehr | H04L 67/322 |
| 2019/0166533 A1* | 5/2019 | Li | H04W 36/08 |
| 2019/0182639 A1* | 6/2019 | Basu Mallick | H04W 4/40 |
| 2019/0246420 A1* | 8/2019 | Park | H04W 72/0433 |
| 2019/0253958 A1* | 8/2019 | Lee | H04W 16/14 |
| 2019/0274143 A1* | 9/2019 | Loehr | H04L 5/0007 |
| 2019/0289615 A1* | 9/2019 | Lee | H04W 92/18 |
| 2019/0313375 A1* | 10/2019 | Loehr | H04W 72/04 |
| 2019/0327753 A1* | 10/2019 | Lee | H04W 72/12 |
| 2019/0350045 A1* | 11/2019 | Lee | H04W 72/02 |
| 2019/0373609 A1* | 12/2019 | Kim | H04B 17/336 |
| 2020/0045724 A1* | 2/2020 | Lu | H04W 72/1242 |
| 2020/0146040 A1* | 5/2020 | Lee | H04W 72/1268 |
| 2020/0178290 A1* | 6/2020 | Lee | H04W 74/0841 |

OTHER PUBLICATIONS

InterDigital Communications, Resource Allocation for V2X reduced latency over PC5, Oct. 9, 2015, 3GPP, 3GPP TSG-RAN WG1 Meeting #82bis, Tdoc: R1-155632 (Year: 2015).*
CATT, Considerations on V2X traffic priority and relative resource allocation, Nov. 22, 2015, 3GPP, 3GPP TSG RAN WG1 Meeting #83, Tdoc: R1-156609 (Year: 2015).*
Samsung, Resource allocation and latency reduction enhancements for V2X, Nov. 22, 2015, 3GPP, 3GPP TSG RAN WG1 Meeting #83, Tdoc: R1-156811 (Year: 2015).*
Samsung, SA enhancement for PC5 based V2X communication, Nov. 22, 2015, 3GPP, 3GPP TSG RAN WG1 #83, Tdoc: R1-156812 (Year: 2015).*
Panasonic, Discussion on resource allocation mechanism in V2X, Nov. 22, 2015, 3GPP, 3GPP TSG RAN WG1 Meeting #83, Tdoc: R1-156963 (Year: 2015).*
Huawei et al., QoS Support for V2X transmission, Feb. 19, 2016, 3GPP, 3GPP TSG-RAN WG2 Meeting #93, Tdoc: R2-161101 (Year: 2016).*
Huawei, LS on V2X QoS support, Feb. 19, 2016, 3GPP, 3GPP TSG-RAN WG2 Meeting #93, Tdoc: R2-161102 (Year: 2016).*
Huawei et al., QoS Requirements for V2X transmission, Apr. 15, 2016, 3GPP, 3GPP TSG-RAN WG2 Meeting #93bis, Tdoc: R2-162284 (Year: 2016).*
Potevio, Some consideration of Resource Allocation in V2X, Apr. 15, 2016, 3GPP, 3GPP TSG-RAN WG2 #93bis, Tdoc: R2-162491 (Year: 2016).*
Qualcomm Incorporated, V2X Communications, Apr. 15, 2016, 3GPP, 3GPP TSG-RAN WG2 Meeting #93Bis, Tdoc: R2-162728 Year: (2016).*
Ericsson, Sidelink Resource Allocation in V2X, Apr. 15, 2016, 3GPP, 3GPP TSG-RAN WG2 Meeting #93Bis, Tdoc: R2-162818 Year: (2016).*
InterDigital, Possible SPS Enhancements for V2X, Apr. 15, 2016, 3GPP, 3GPP TSG-RAN WG2 #93bis, Tdoc: R2-162825 (Year: 2016).*
Wong (Nokia), Reply LS on QoS requirements for V2X, Feb. 17, 2017, 3GPP, 3GPP TSG RAN WG2#97, Tdoc: R2-1700714 (Year: 2017).*
Huawei et al., On the Remaining Issues for UL/V2X SL Tx Prioritization, Feb. 17, 2017, 3GPP, 3GPP TSG RAN WG2 Meeting #97, Tdoc: R2-1701371 (Year: 2017).*
Huawei, Summary of [96#59][LTE/V2X] on Uu/SL prioritization, Feb. 17, 2017, 3GPP, 3GPP TSG-RAN WG2 Meeting #97, Tdoc: R2-1701375 (Year: 2017).*
LG Electronics Inc., Coexistence of transmission of V2X sidelink communication and Uu, Feb. 17, 2017, 3GPP, 3GPP TSG-RAN2 Meeting #97, Tdoc: R2-1701980 (Year: 2017).*
Ericsson et al., Clarify relation of PPPP, PDB & priority, Jan. 20, 2017, 3GPP, SA WG2 Meeting #S2-118BIS, Tdoc: S2-170371 (Year: 2017).*
3GPP TR 21.905 13.0.0, "3rd Generation Partnership Project; Technical Specification Group Services and System Aspects; Vocabulary for 3GPP Specifications (Release 13)," Dec. 2015, 64 pages.
3GPP TR 23.713 V13.0.0, "3rd Generation Partnership Project; Technical Specification Group Services and System Aspects; Study on extended architecture support for proximity-based services (Release 13)," Sep. 2015, 80 pages.
3GPP TS 23.303 V13.3.0, "3rd Generation Partnership Project; Technical Specification Group Services and System Aspects; Proximity-based services (ProSe); Stage 2 (Release 13)," Mar. 2016, 124 pages.
3GPP TS 36.211 V13.0.0, "3$^{rd}$ Generation Partnership Project; Technical Specification Group Radio Access Network; Evolved Universal Terrestrial Radio Access (E-UTRA); Physical channels and modulation (Release 13)," December 2015, 142 pages.
3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)," Mar. 2016, 129 pages.
3GPP TS 36.300 V13.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," Dec. 2015, 290 pages.
3GPP TS 36.321 V13.0.0, "3rd Generation Partnership Project; Technical Specification Group Radio Access Network; Evolved Universal Terrestrial Radio Access (E-UTRA); Medium Access Control (MAC) protocol specification (Release 13)," Dec. 2015, 82 pages.
3GPP TS 36.321 V13.1.0, "3rd Generation Partnership Project; Technical Specification Group Radio Access Network; Evolved Universal Terrestrial Radio Access (E-UTRA); Medium Access Control (MAC) protocol specification (Release 13)," Mar. 2016, 85 pages.

(56) References Cited

OTHER PUBLICATIONS

Catt, "Considerations on V2V traffic priority and relative resource allocation," R1-162273, *3GPP TSG RAN WG1 Meeting #84bis,* Busan, Korea, Apr. 11-15, 2016, 4 pages.
ETSI EN 302 637-2 V1.3.1, "Intelligent Transport Systems (ITS); Vehicular Communications; Basic Set of Applications; Part 2: Specification of Cooperative Awareness Basic Service," Sep. 2014, 44 pages.
ETSI EN 302 637-3 V1.2.1, "Intelligent Transport Systems (ITS); Vehicular Communications; Basic Set of Applications; Part 3: Specifications of Decentralized Environmental Notification Basic Service," Sep. 2014, 73 pages.
Extended European Search Report, dated Oct. 31, 2016, for European Application No. 16169663.8-1857, 12 pages.
Huawei, HiSiticon, "Configuration of PC5 and/or Uu for V2V transport," R2-162289, *3GPP TSG-RAN WG2 Meeting #93bis,* Dubrovnik, Croatia, Apr. 11-15, 2016, 6 pages.
Huawei, HiSiticon, "Support of QoS for PC5-based V2V transport," R1-162286, *3GPP TSG-RAN WG2 Meeting #93bis,* Dubrovnik, Croatia, Apr. 11-15, 2016, 6 pages.
International Search Report, dated Apr. 3, 2017, for International Application No. PCT/EP2017/053381, 5 pages.
LG Electronics Inc., "Correction on V2X Priority," S1-161137, *3GPP TSG-SA WG1 #74,* Venice, Italy, May 9-13, 2016, 6 pages.
LG Electronics Inc., "Resource allocation enhancement for V2V," R2-162923, *3GPP TSG-RAN2 Meeting #93bis,* Dubrovnik, Croatia, Apr. 11-15, 2016, 4 pages.

* cited by examiner

MECHANISM FOR QOS IMPLEMENTATION IN VEHICULAR COMMUNICATION

BACKGROUND

Technical Field

The present disclosure relates to improved transmission of vehicular and other data by a vehicular mobile terminal. The present disclosure is providing the corresponding (vehicular) mobile terminal and the radio base station.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the Sha interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols. $N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", current version 13.0.0, section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

MAC Layer/Entity, Radio Bearer, QoS

The LTE layer 2 user-plane/control-plane protocol stack comprises four sublayers, RRC, PDCP, RLC and MAC. The Medium Access Control (MAC) layer is the lowest sublayer in the Layer 2 architecture of the LTE radio protocol stack and is defined by, e.g., the 3GPP technical standard TS 36.321, current version 13.1.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

FIG. 3 illustrates one possible structure for the UE-side MAC entity, as presented in the technical standard TS 36.321, current version 13.1.0, section 4.2.1 "MAC Entities", incorporated in its entirety herein by reference. The following functions are generally supported by a MAC sublayer in the UE:

mapping between logical channels and transport channels;
multiplexing of MAC SDUs from one or different logical channels onto transport blocks (TB) to be delivered to the physical layer on transport channels;
demultiplexing of MAC SDUs from one or different logical channels from transport blocks (TB) delivered from the physical layer on transport channels;
scheduling information reporting;
error correction through HARQ;
Logical Channel Prioritization; and
radio resource selection for SL.

As apparent from FIG. 3, the MAC entity correspondingly comprises further entities (functions), such as the Hybrid HARQ (HARQ) entity, multiplexing and demultiplexing entities, a Logical Channel Prioritization entity (for uplink only), and a controller which performs various control functions for the MAC entity. The MAC entities/functions are defined in detail in TS 36.321, current version 13.1.0, e.g., section 5 "MAC procedure", incorporated herein by reference in its entirety.

In the multiplexing and demultiplexing entity, data from several logical channels can be (de)-multiplexed into/from one transport channel. The multiplexing entity generates MAC PDUs from MAC SDUs when radio resources are available for a new transmission; this process includes prioritizing the data from the logical channels to decide how much data and from which logical channels should be included in each MAC PDU.

The MAC layer provides a data transfer service (see subclauses 5.4 and 5.3 of TS 36.321 incorporated herein by reference) for the RLC layer through logical channels, which are either control logical channels which carry control data (e.g., RRC signaling) or traffic logical channels which carry user plane data. The following control logical channels, as illustrated in FIG. 3, are defined: broadcast control channel (BCCH), paging control channel (PCCH), common control channel (CCCH), multicast control channel (MCCH), and dedicated control channel (DCCH). The traffic logical channels are the dedicated traffic channel (DTCH) and the multicast traffic channel (MTCH).

The logical channels are associated with one out of four different Logical Channel Groups (LCGs) with the LCG IDs 0-3, e.g., for the purpose of buffer status reporting, as will be explained in detail later.

On the other hand, the data from the MAC layer is exchanged with the physical layer through transport channels, which are classified as downlink or uplink. Data is multiplexed into transport channels depending on how it is transmitted over the air. The following downlink transport channels are defined: Broadcast channel (BCH), downlink shared channel (DL-SCH), paging channel (PCH), and multicast channel (MCH). The following uplink transport channels are defined: uplink shared channel (UL-SCH) and random access channel (RACH). Further information regarding the logical channels and the transport channels and their mapping in between can be found in the 3GPP technical standard 36.321, current version 13.1.0 in clause 4.5 "Channel Structure", incorporated in its entirety herein by reference.

The Physical layer is responsible for the actual transmission of data and control information via the air interface, i.e., the Physical Layer carries all information from the MAC transport channels over the air interface on the transmission side.

In a mobile network using the Long Term Evolution (LTE) architecture, bearers are the "tunnels" used to connect the user equipment to Packet Data Networks (PDNs) such as the Internet. In LTE networks, QoS is implemented between UE and PDN Gateway and is applied to a set of bearers. 'Bearer' is basically a virtual concept and a set of network configuration to provide special treatment to a set of traffic, e.g., VoIP packets are prioritized by the network compared to web-browser traffic. Essentially, each stream of different characteristics (e.g., delay, delivery time, throughput, SNR, error-rate jitter etc.) is mapped to different bearers. Thus, a bearer is a unit of QoS control, and one bearer is used to fulfil one set of QoS requirements.

Each bearer uses a set of QoS parameters to describe the properties of the transporting channel, such as bit rates, packet delay, packet loss, bit error rate and scheduling policy. Four key parameters are outlined here.

QoS Class Indicator (QCI):

The QCI basically defines a unique expected treatment of a bearer and is intended to provide similar handling of bearers of the same QCI even if network nodes are developed by different vendors. Based on the received QCI value, each network node knows how to treat the corresponding associated bearer, i.e., a QCI value is associated to a bearer. The list of current defined QCI values can be found in 3GPP TS 23.203, current version 13.3.0, section 6.1.7.

Allocation and Retention Priority (ARP):

ARP specifies the forwarding treatment for the control-plane traffic that the bearers receive. ARP enables bearer establishment and modification, as well as connection setup and release. For example, ARP can be used by the EPS to decide which bearer should be released during resource limitations or traffic congestion.

Maximum Bit Rate (MBR):

MBR is applicable only for real-time services and is defined for GBR bearers. MBR is the bit rate that the traffic on the bearer may not exceed.

Guaranteed Bit Rate (GBR):

GBR specifies the bit rate that the network guarantees (e.g., through the use of an admission control function) for that bearer. In 3GPP Release 8 and beyond, the MBR must be set equal to the GBR; that is, the guaranteed rate is also the maximum rate that is allowed by the system.

A QCI is a scalar that is used as a reference to access node-specific parameters that control bearer level packet forwarding treatment (e.g., scheduling weights, admission thresholds, queue management thresholds, link layer protocol configuration, etc.), and that have been pre-configured by the operator owning the access node (e.g., eNodeB). A one-to-one mapping of standardized QCI values to standardized characteristics is captured in TS 23.203 v13.3.0.

Uplink Access Scheme for LTE

For uplink transmission, power-efficient user-terminal transmission is necessary to maximize coverage. Single-carrier transmission combined with FDMA with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA), and the corresponding improved power-amplifier efficiency and improved coverage (higher data rates for a given terminal peak power). During each time interval, eNodeB assigns users a unique time/frequency resource for transmitting user data, thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size BWgrant during one time interval, e.g., a subframe, onto which coded information bits are mapped. It should be noted that a transmission time interval (TTI) (e.g., 1ms, i.e., 1 subframe) is the smallest time interval for user data transmission. It is however possible to assign a frequency resource BWgrant over a longer time period than one TTI to a user by concatenation of subframes.

Layer 1/Layer 2 Control Signaling

In order to inform the scheduled users about their allocation status, transport format, and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length, e.g., can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Downlink control information occurs in several formats that differ in overall size and also in the information contained in their fields. The different DCI formats that are currently defined for LTE are described in detail in 3GPP TS 36.212, "Multiplexing and channel coding", section 5.3.3.1 (current version v13.1.0 incorporated herein by reference). For instance:

Format 0: DCI Format 0 is used for the transmission of resource grants for the PUSCH, using single-antenna port transmissions in uplink transmission mode 1 or 2;

Format 4: DCI Format 4 is used for the scheduling of the PUSCH, using closed-loop spatial multiplexing transmissions in uplink transmission mode 2; and Format 5: DCI format 5 is used for the scheduling of the PSCCH (Physical Sidelink Control Channel), and also contains several SCI format 0 fields used for the scheduling of the PSSCH (Physical Sidelink Shared Control Channel). If the number of information bits in DCI format 5 mapped onto a given search space is less than the payload size of format 0 for scheduling the same serving cell, zeros shall be appended to format 5 until the payload size equals that of format 0 including any padding bits appended to format 0.

The 3GPP technical standard TS 36.212, current version 13.1.0, defines in subclause 5.4.3, incorporated herein by reference, control information for the sidelink.

SCI may transport sidelink scheduling information for one destination ID. SCI Format 0 is defined for use for the scheduling of the PSSCH. The following information is transmitted by means of the SCI format 0:

Frequency hopping flag—1 bit;

Resource block assignment and hopping resource allocation;

Time resource pattern—7 bits;

Modulation and coding scheme—5 bits;

Timing advance indication—11 bits; and

Group destination ID—8 bits.

Logical Channel Prioritization, LCP, Procedure

For the uplink, the process by which a UE creates a MAC PDU to be transmitted using the allocated radio resources is fully standardized; the LCP procedure is designed to ensure that the UE satisfies the QoS of each configured radio bearer in a way which is optimal and consistent between different UE implementations. Based on the uplink transmission resource grant message signaled on the PDCCH, the UE has to decide on the amount of data for each logical channel to be included in the new MAC PDU and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel is served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels. Starvation means that the data from the low-priority logical channels cannot be transmitted because the data from high-priority logical channels takes up all the MAC PDU space.

In LTE, a Prioritized Bit Rate (PBR) is defined for each logical channel, so as to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also a MAC CE. Except for a Padding BSR, the MAC CE has a higher priority than a MAC SDU from the logical channels because it controls the operation of the MAC layer. Thus, when a MAC PDU is composed, the MAC CE, if it exists, is the first to be included, and the remaining space is used for MAC SDUs from the logical channels. Then, if additional space is left and it is large enough to include a BSR, a Padding BSR is triggered and included in the MAC PDU.

The Logical Channel Prioritization is standardized, e.g., in 3GPP TS 36.321, current version v13.1.0, in subclause 5.4.3.1 incorporated herein by reference. The Logical Channel Prioritization (LCP) procedure is applied when a new transmission is performed.

Buffer Status Reporting

Buffer status reports (BSR) from the UE to the eNodeB are used to assist the eNodeB in allocating uplink resources, i.e., uplink scheduling. For the downlink case, the eNB scheduler is obviously aware of the amount of data to be delivered to each UE. However, for the uplink direction, since scheduling decisions are done at the eNB and the buffer for the data is in the UE, BSRs have to be sent from the UE to the eNB in order to indicate the amount of data that needs to be transmitted over the UL-SCH.

Buffer Status Report MAC control elements for LTE consist of either: a long BSR (with four buffer size fields corresponding to the four LCG IDs #0-3) or a short BSR (with one LCG ID field and one corresponding buffer size field). The buffer size field indicates the total amount of data available across all logical channels of a logical channel group and is indicated in number of bytes encoded as an index of different buffer size levels (see also 3GPP TS 36.321, current version 13.1.0, subclause 6.1.3.1, incorporated herewith by reference).

Which one of either the short or the long BSR is transmitted by the UE depends on the available transmission resources in a transport block, on how many groups of logical channels have non-empty buffers and on whether a specific event is triggered at the UE.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

In order to be robust against transmission failures, there is a BSR retransmission mechanism defined for LTE; the retransmission BSR timer is started or restarted whenever an uplink grant is received; if no uplink grant is received before the retransmission BSR timer expires, another BSR is triggered in the UE.

A BSR is triggered for events, such as:
Whenever data arrives for a logical channel, which has a higher priority than the logical channels whose buffer are non-empty (i.e., whose buffer previously contained data);
Whenever data becomes available for any logical channel, when there was previously no data available for transmission (i.e., all buffers previously empty);
Whenever the retransmission BSR time expires;
Whenever periodic BSR reporting is due, i.e., periodicBSR timer expires; and
Whenever there is a spare space in a transport block which can accommodate a BSR.

More detailed information with regard to BSR and in particular the triggering of same is explained in 3GPP TS 36.321 v13.1.0 in subclause 5.4.5 incorporated herein by reference.

If the UE has no uplink resources allocated for including a BSR in the transport block when a BSR is triggered, the UE sends a scheduling request (SR) to the eNodeB so as to be allocated with uplink resources to transmit the BSR. Either a single-bit scheduling request is sent over the PUCCH (dedicated scheduling request, D-SR), or the random access procedure (RACH) is performed to request an allocation of an uplink radio resource for sending a BSR.

LTE Device to Device (D2D) Proximity Services (ProSe)

Proximity-based applications and services represent an emerging social-technological trend. The identified areas include services related to commercial services and Public Safety that would be of interest to operators and users. The introduction of a Proximity Services (ProSe) capability in LTE would allow the 3GPP industry to serve this developing market and will, at the same time, serve the urgent needs of several Public Safety communities that are jointly committed to LTE.

Device-to-Device (D2D) communication is a technology component introduced by LTE-Rel.12, which allows D2D as an underlay to the cellular network to increase the spectral efficiency. For example, if the cellular network is LTE, all data-carrying physical channels use SC-FDMA for D2D signaling. In D2D communications, user equipments transmit data signals to each other over a direct link using the cellular resources instead of through the radio base station. Throughout the disclosure the terms "D2D", "ProSe" and "sidelink" are interchangeable.

The D2D communication in LTE is focusing on two areas: Discovery and Communication.

ProSe (Proximity-based Services) Direct Discovery is defined as the procedure used by the ProSe-enabled UE to discover other ProSe-enabled UE(s) in its proximity using E-UTRA direct radio signals via the PC5 interface.

In D2D communication, UEs transmit data signals to each other over a direct link using the cellular resources instead of through the base station (BS). D2D users communicate directly while remaining controlled under the BS, i.e., at least when being in coverage of an eNB. Therefore, D2D can improve system performance by reusing cellular resources.

It is assumed that D2D operates in the uplink LTE spectrum (in the case of FDD) or uplink sub-frames of the cell giving coverage (in case of TDD, except when out of coverage). Furthermore, D2D transmission/reception does not use full duplex on a given carrier. From individual UE perspective, on a given carrier D2D signal reception and LTE uplink transmission do not use full duplex, i.e., no simultaneous D2D signal reception and LTE UL transmission is possible.

In D2D communication, when one particular UE1 has a role of transmission (transmitting user equipment or transmitting terminal), UE1 sends data, and another UE2 (receiving user equipment) receives it. UE1 and UE2 can change their transmission and reception role. The transmission from UE1 can be received by one or more UEs like UE2.

ProSe Direct Communication Layer-2 Link

In brief, ProSe direct one-to-one communication is realized by establishing a secure layer-2 link over PC5 between two UEs. Each UE has a Layer-2 ID for unicast communication that is included in the Source Layer-2 ID field of every frame that it sends on the layer-2 link and in the Destination Layer-2 ID of every frame that it receives on the layer-2 link. The UE needs to ensure that the Layer-2 ID for unicast communication is at least locally unique. So the UE should be prepared to handle Layer-2 ID conflicts with adjacent UEs using unspecified mechanisms (e.g., self-assign a new Layer-2 ID for unicast communication when a conflict is detected). The layer-2 link for ProSe direct communication one-to-one is identified by the combination of the Layer-2 IDs of the two UEs. This means that the UE can engage in multiple layer-2 links for ProSe direct communication one-to-one using the same Layer-2 ID.

ProSe direct communication one-to-one is composed of the following procedures as explained in detail in TR 23.713 current version v13.0.0 section 7.1.2 incorporated herein by reference:

Establishment of a secure layer-2 link over PC5;
IP address/prefix assignment;
Layer-2 link maintenance over PC5; and
Layer-2 link release over PC5.

FIG. 4 illustrates how to establish a secure layer-2 link over the PC5 interface.

1. UE-1 sends a Direct Communication Request message to UE-2 in order to trigger mutual authentication. The link initiator (UE-1) needs to know the Layer-2 ID of the peer (UE-2) in order to perform step 1. As an example, the link initiator may learn the Layer-2 ID of the peer by executing a discovery procedure first or by having participated in ProSe one-to-many communication including the peer.

2. UE-2 initiates the procedure for mutual authentication. The successful completion of the authentication procedure completes the establishment of the secure layer-2 link over PC5.

UEs engaging in isolated (non-relay) one-to-one communication may also use link-local addresses. The PC5 Signaling Protocol shall support keep-alive functionality that is used to detect when the UEs are not in ProSe Communication range, so that they can proceed with implicit layer-2 link release. The Layer-2 link release over the PC5 can be performed by using a Disconnect Request message transmitted to the other UE, which also deletes all associated context data. Upon reception of the Disconnect Request message, the other UE responds with a Disconnect Response message and deletes all context data associated with the layer-2 link.

ProSe Direct Communication Related Identities

3GPP TS 36.300, current version 13.2.0, defines in subclause 8.3 the following identities to use for ProSe Direct Communication:

SL-RNTI: Unique identification used for ProSe Direct Communication Scheduling;

Source Layer-2 ID: Identifies the sender of the data in sidelink ProSe Direct Communication. The Source Layer-2 ID is 24 bits long and is used together with ProSe Layer-2 Destination ID and LCD for identification of the RLC UM entity and PDCP entity in the receiver; and Destination Layer-2 ID: Identifies the target of the data in sidelink ProSe Direct Communication. The Destination Layer-2 ID is 24 bits long and is split in the MAC layer into two bit strings:

One bit string is the LSB part (8 bits) of Destination Layer-2 ID and forwarded to the physical layer as Sidelink Control Layer-1 ID. This identifies the target of the intended data in Sidelink Control and is used for filtering packets at the physical layer; and Second bit string is the MSB part (16 bits) of the Destination Layer-2 ID and is carried within the MAC header. This is used for filtering packets at the MAC layer.

No Access Stratum signaling is required for group formation and to configure Source Layer-2 ID, Destination Layer-2 ID and Sidelink Control L1 ID in the UE. These identities are either provided by a higher layer or derived from identities provided by a higher layer. In case of groupcast and broadcast, the ProSe UE ID provided by the higher layer is used directly as the Source Layer-2 ID, and the ProSe Layer-2 Group ID provided by the higher layer is used directly as the Destination Layer-2 ID in the MAC layer. In case of one-to-one communications, higher layer provides Source Layer-2 ID and Destination Layer-2 ID.

Radio Resource Allocation for Proximity Services

From the perspective of a transmitting UE, a Proximity-Services-enabled UE (ProSe-enabled UE) can operate in two modes for resource allocation:

Mode 1 refers to the eNB-scheduled resource allocation, where the UE requests transmission resources from the eNB (or Release-10 relay node), and the eNodeB (or Release-10 relay node) in turn schedules the resources used by a UE to transmit direct data and direct control information (e.g., Scheduling Assignment). The UE needs to be RRC_CONNECTED in order to transmit data. In particular, the UE sends a scheduling request (D-SR or Random Access) to the eNB followed by a buffer status report (BSR) in the usual manner (see also following chapter "Transmission procedure for D2D communication"). Based on the BSR, the eNB can determine that the UE has data for a ProSe Direct Communication transmission and can estimate the resources needed for transmission.

On the other hand, Mode 2 refers to the UE-autonomous resource selection, where a UE on its own selects resources (time and frequency) from resource pool(s) to transmit direct data and direct control information (i.e., SA). One resource pool is defined, e.g., by the content of SIB18, namely by the field commTxPoolNormalCommon, this particular resource pool being broadcast in the cell and then commonly available for all UEs in the cell still in RRC_Idle state. Effectively, the eNB may define up to four different instances of said pool, respectively four resource pools for the transmission of SA messages and direct data. However, in Rel-12 a UE shall always use the first resource pool defined in the list, even if it was configured with multiple resource pools. This restriction was removed for Rel-13, i.e., a UE can transmit on multiple of the configured resource pools within one SC period. How the UE selects the resource pools for transmission is further outlined below (further specified in TS36.321).

FIG. 5 illustrates the use of transmission/reception resources for overlay (LTE) and underlay (D2D) system. Basically, the eNodeB controls whether UE may apply the Mode 1 or Mode 2 transmission. Once the UE knows its resources where it can transmit (or receive) D2D communication, it uses the corresponding resources only for the corresponding transmission/reception. For example, in FIG. 5 the D2D subframes will only be used to receive or transmit the D2D signals. Since the UE as a D2D device would operate in Half Duplex mode, it can either receive or transmit the D2D signals at any point of time. Similarly, the other subframes illustrated in FIG. 5 can be used for LTE (overlay) transmissions and/or reception.

Transmission Procedure for D2D Communication

The D2D data transmission procedure differs depending on the resource allocation mode. As described above for Mode 1, the eNB explicitly schedules the resources for the Scheduling Assignment and the D2D data communication after a corresponding request from the UE. Particularly, the UE may be informed by the eNB that D2D communication is generally allowed, but that no Mode 2 resources (i.e., resource pool) are provided; this may be done, e.g., with the exchange of the D2D communication Interest Indication by the UE and the corresponding response, D2D Communication Response, where the corresponding exemplary ProseCommConfig information element would not include the commTxPoolNormalCommon, meaning that a UE that wants to start direct communication involving transmissions has to request E-UTRAN to assign resources for each individual transmission. Thus, in such a case, the UE has to request the resources for each individual transmission, and in the following the different steps of the request/grant procedure are exemplarily listed for this Mode 1 resource allocation:

Step 1: UE sends SR (Scheduling Request) to eNB via PUCCH;
Step 2: eNB grants UL resource (for UE to send BSR) via PDCCH, scrambled by C-RNTI;
Step 3: UE sends D2D BSR indicating the buffer status via PUSCH;
Step 4: eNB grants D2D resource (for UE to send data) via PDCCH, scrambled by D2D-RNTI; and
Step 5: D2D Tx UE transmits SA/D2D data according to grant received in step 4.

A Scheduling Assignment (SA), also termed SCI (Sidelink Control Information) is a compact (low-payload) message containing control information, e.g., pointer(s) to time-frequency resources, modulation and coding scheme and Group Destination ID for the corresponding D2D data transmission. An SCI transports the sidelink scheduling information for one (ProSE) destination ID. The content of the SA (SCI) is basically in accordance with the grant received in Step 4 above. The D2D grant and SA content (i.e., SCI content) are defined in the 3GPP technical standard 36.212, current version 13.1.0, subclause 5.4.3, incorporated herein by reference, defining in particular the SCI format 0 (see content of SCI format 0 above).

On the other hand, for Mode 2 resource allocation, above steps 1-4 are basically not necessary, and the UE autonomously selects resources for the SA and D2D data transmission from the transmission resource pool(s) configured and provided by the eNB.

FIG. 6 exemplarily illustrates the transmission of the Scheduling Assignment and the D2D data for two UEs, UE-1 and UE-2, where the resources for sending the scheduling assignments are periodic, and the resources used for the D2D data transmission are indicated by the corresponding Scheduling Assignment.

FIG. 7 illustrates the D2D communication timing for Mode 2, autonomous scheduling, during one SA/data period, also known as SC period, Sidelink Control period. FIG. 8 illustrates the D2D communication timing for Mode 1, eNB-scheduled allocation during one SA/data period. A SC period is the time period consisting of transmission of a Scheduling Assignment and its corresponding data.

As currently specified in the standard, for one sidelink grant, e.g., either sent by the eNB or selected by the UE itself, the UE can transmit multiple transport blocks, MAC PDUs, (only one per subframe (TTI), i.e., one after the other), however to only one ProSe destination group. Also the retransmissions of one transport block must be finished before the first transmission of the next transport block starts, i.e., only one HARQ process is used per sidelink grant for the transmission of the multiple transport blocks. Furthermore, the UE can have and use several sidelink grants per SC period, but a different ProSe destination be selected for each of them. Thus, in one SC period the UE can transmit data to one ProSe destination only one time.

The sidelink data transmission procedure can be found in the 3GPP standard document TS 36.321 v13.1.0, section 5.14, incorporated herein by reference. Therein, the Mode-2 autonomous resource selection is described in detail, differentiating between being configured with a single radio resource pool or multiple radio resource pools.

ProSe Network Architecture and ProSe Entities

FIG. 9 illustrates a high-level exemplary architecture for a non-roaming case, including different ProSe applications in the respective UEs A and B, as well as a ProSe Application Server and ProSe function in the network. The example architecture of FIG. 9 is taken from TS 23.303 v.13.3.0 chapter 4.2 "Architectural Reference Model" incorporated herein by reference.

The functional entities are presented and explained in detail in TS 23.303 subclause 4.4 "Functional Entities" incorporated herein by reference. The ProSe function is the logical function that is used for network-related actions required for ProSe and plays different roles for each of the features of ProSe. The ProSe function is part of the 3GPP's EPC and provides all relevant network services like authorization, authentication, data handling etc. related to proximity services. For ProSe direct discovery and communication, the UE may obtain a specific ProSe UE identity, other configuration information, as well as authorization from the ProSe function over the PC3 reference point. There can be multiple ProSe functions deployed in the network, although for ease of illustration a single ProSe function is presented. The ProSe function consists of three main sub-functions that perform different roles depending on the ProSe feature: Direct Provision Function (DPF), Direct Discovery Name Management Function, and EPC-level Discovery Function. The DPF is used to provision the UE with the necessary parameters to use ProSe Direct Discovery and ProSe Direct Communication.

The term "UE" used in said connection refers to a ProSe-enabled UE supporting ProSe functionality, such as:
Exchange of ProSe control information between ProSe-enabled UE and the ProSe Function over PC3 reference point;
Procedures for open ProSe Direct Discovery of other ProSe-enabled UEs over PC5 reference point;
Procedures for one-to-many ProSe Direct Communication over PC5 reference point;
Procedures to act as a ProSe UE-to-Network Relay. The Remote UE communicates with the ProSe UE-to-Network Relay over PC5 reference point. The ProSe UE-to Network Relay uses layer-3 packet forwarding;

Exchange of control information between ProSe UEs over PC5 reference point, e.g., for UE-to-Network Relay detection and ProSe Direct Discovery;

Exchange of ProSe control information between another ProSe-enabled UE and the ProSe Function over PC3 reference point. In the ProSe UE-to-Network Relay case the Remote UE will send this control information over PC5 user plane to be relayed over the LTE-Uu interface towards the ProSe Function; and Configuration of parameters (e.g., including IP addresses, ProSe Layer-2 Group IDs, Group security material, radio resource parameters). These parameters can be pre-configured in the UE, or, if in coverage, provisioned by signaling over the PC3 reference point to the ProSe Function in the network.

The ProSe Application Server supports the Storage of EPC ProSe User IDs, and ProSe Function IDs, and the mapping of Application Layer User IDs and EPC ProSe User IDs. The ProSe Application Server (AS) is an entity outside the scope of 3GPP. The ProSe application in the UE communicates with the ProSe AS via the application-layer reference point PC1. The ProSe AS is connected to the 3GPP network via the PC2 reference point.

LCP Procedure for D2D, Sidelink Logical Channels

The LCP procedure for D2D will be different than the above-presented LCP procedure for "normal" LTE data. The following information is taken from TS 36.321, current version 13.1.0, subclause 5.14.1.3.1 describing the LCP procedure for ProSe; it is incorporated herewith in its entirety by reference.

The Logical Channel Prioritization procedure is applied when a new transmission is performed. Each sidelink logical channel has an associated priority which can be the PPPP (ProSe per packet priority, explained later). Multiple sidelink logical channels may have the same associated priority. The mapping between priority and LCID is left for UE implementation.

The MAC entity shall perform the following Logical Channel Prioritization procedure for each SCI transmitted in an SC period:

The MAC entity shall allocate resources to the sidelink logical channels in the following steps:

Step 0: Select a ProSe Destination, not previously selected for this SC period, having the sidelink logical channel with the highest priority, among the sidelink logical channels having data available for transmission;

Step 1: Among the sidelink logical channels belonging to the selected ProSe Destination and having data available for transmission, allocate resources to the sidelink logical channel with the highest priority; and Step 2: if any resources remain, sidelink logical channels belonging to the selected ProSe Destination are served in decreasing order of priority until either the data for the sidelink logical channel(s) or the SL grant is exhausted, whichever comes first. Sidelink logical channels configured with equal priority should be served equally.

The UE shall also follow the rules below during the scheduling procedures above:

The UE shall allocate resources to the sidelink logical channels according to the following rules:

the UE should not segment an RLC SDU (or partially transmitted SDU) if the whole SDU (or partially transmitted SDU) fits into the remaining resources;

if the UE segments an RLC SDU from the sidelink logical channel, it shall maximize the size of the segment to fill the grant as much as possible;

the UE should maximize the transmission of data; and if the MAC entity is given a sidelink grant size that is equal to or larger than 10 bytes while having data available for transmission, the MAC entity shall not transmit only padding.

Generally, for one MAC PDU, MAC shall consider only logical channels with the same Source Layer-2 ID—Destination Layer 2 ID pairs, i.e., for one MAC PDU, the MAC entity in the UE shall consider only logical channels of the same ProSe destination group, which basically means that the UE selects a ProSe destination during the LCP procedure. In Rel-13 it is allowed to have more than one Sidelink Grant within a SC period. For each sidelink grant the UE can as in Rel-12 only transmit data of one ProSe destination group. However, since the UE can be configured to have more than one valid sidelink grant within one SC period, a transmitting UE can transmit data to different ProSe destinations, i.e., each SL grant must transmit data to a different ProSe destination.

QoS Support for ProSe

In Rel-13 QoS is supported generally for ProSe one-to-many communication. For that reason the so-called ProSe Per-Packet Priority (PPPP) was introduced, e.g., in TS 23.303. ProSe Per-Packet Priority is a scalar value associated with a protocol data unit, e.g., IP packet, and defines the priority handling to be applied for transmission of that protocol data unit, i.e., priority handling for transmissions on the PC5 interface. In other words, ProSe PPP is a mechanism used to allow prioritization of packets when using ProSe Direct Communication including for ProSe UE-to-UE and also for ProSe Relay.

When the ProSe upper layer (i.e., above PC5 access stratum) passes a protocol data unit for transmission to the PC5 access stratum, the ProSe upper layer provides a ProSe Per-Packet Priority from a range of 8 possible values.

The ProSe Per-Packet Priority is independent of the Destination Layer-2 ID and applies to both one-to-one and one-to-many ProSe Direct Communication. The ProSe Per-Packet Priority is selected by the application layer, e.g., based on various criteria that are outside the scope of this specification (such as delay requirements of the service like Voice packet transmissions or control signaling like floor control related signaling).

The ProSe Per-Packet Priority is independent of the mode in which the UE accesses the medium i.e., whether scheduled or autonomous resource allocation mode for ProSe communication is used. The ProSe access stratum uses the ProSe Per-Packet Priority associated with the protocol data unit as received from the upper layers to prioritize the transmission in respect with other intra-UE transmissions (i.e., protocol data units associated with different priorities awaiting transmission inside the same UE) and inter-UE transmissions (i.e., protocol data units associated with different priorities awaiting transmission inside different UEs).

Priority queues (both intra-UE and inter-UE) are expected to be served in strict priority order, i.e., UE or eNB serves all packets associated with ProSe Per-Packet Priority N before serving packets associated with priority N+1 (lower number meaning higher priority).

The priority handling on the PC5 interface itself is specified in TS 36.321, i.e., by the logical channel prioritization LCP procedure for D2D already presented above. For each sidelink logical channel there will be an associated priority, e.g., similar to logical channel priority in legacy LTE UL operation. The creation of sidelink logical channels will be left to UE implementation, similar to Rel-12. In addition to taking source/destination ID of packets into account when creating a logical channel, the UE will also take into account the priority of packets. Essentially protocol data units having the same PPPP value (and same source/destination ID) will be served by one sidelink logical channel with a certain associated logical channel priority, which is the same as PPPP.

As explained above, during logical channel prioritization procedure when the UE receives a SL grant, the UE selects the ProSe group having the sidelink logical channel with the highest PPPP among the sidelink logical channels having SL data, and then serves all sidelink logical channels belonging to the selected ProSe destination group in a decreasing priority order.

Buffer Status Reporting for ProSe

The buffer status reporting is adapted to ProSe, and at present is defined in TS 36.321 in its version 13.1.0, subclause 5.14.1.4 "Buffer Status Reporting" incorporated herein by reference.

The (D2D) sidelink Buffer Status Reporting procedure is used to provide the serving eNB with information about the amount of sidelink data in the sidelink buffers of the UE available for transmission to the other UE. RRC controls sidelink BSR reporting by configuring the two timers Periodic-ProseBSR-Timer and RetxProseBSR-Timer.

A sidelink Buffer Status Report (BSR) shall be triggered if some particular events occur, as specified in detail in TS 36.321, subclause 5.14.1.4.

Furthermore, TS 36.321 in its version 13.1.0, subclause 6.1.3.1a, incorporated herein by reference, defines the ProSe BSR MAC Control Elements and its corresponding content as follows. The ProSe Buffer Status Report (BSR) MAC control element consists of one group index field, one LCG ID field and one corresponding Buffer Size field per reported D2D destination group. More in detail, for each included ProSe destination group, the following fields are defined:

Group index: The group index field identifies the ProSe destination group. The length of this field is 4 bits. The value is set to the index of the destination identity reported in destinationInfoList;

LCG ID: The Logical Channel Group ID field identifies the group of logical channel(s) which buffer status is being reported. The length of the field is 2 bits;

Buffer Size: The Buffer Size field identifies the total amount of data available across all logical channels of a ProSe Destination group after all MAC PDUs for the TTI have been built. The amount of data is indicated in number of bytes; and R: Reserved bit, set to "0".

FIG. 10 shows the ProSe BSR MAC control element for even N (number of ProSe destination groups), taken from TS 36.321 subclause 6.1.3.1a.

Vehicular Communication—V2X Services

A new study item has been set up in the 3GPP to consider the usefulness of new LTE features to the automotive industry—including Proximity Service (ProSE) and LTE-based broadcast services. ProSe functionality is thus considered as offering a good foundation for the V2X services. Connected vehicle technologies aim to tackle some of the biggest challenges in the surface transportation industry, such as safety, mobility, and traffic efficiency.

V2X communication is the passing of information from a vehicle to any entity that may affect the vehicle, and vice versa. This information exchange can be used to improve safety, mobility and environmental applications to include driver assistance, vehicle safety, speed adaptation and warning, emergency response, travel information, navigation, traffic operations, commercial fleet planning and payment transactions.

LTE support for V2X services contains 3 types of different use cases which are the following:

V2V: covering LTE-based communication between vehicles;

V2P: covering LTE-based communication between a vehicle and a device carried by an individual (e.g., handheld terminal carried by a pedestrian, cyclist, driver or passenger); and V2I: covering LTE-based communication between a vehicle and a road side unit.

These three types of V2X can use "co-operative awareness" to provide more intelligent services for end-users. This means that transport entities, such as vehicles, roadside infrastructure, and pedestrians, can collect knowledge of their local environment (e.g., information received from other vehicles or sensor equipment in proximity) to process and share that knowledge in order to provide more intelligent services, such as cooperative collision warning or autonomous driving.

With regard to V2V communication, E-UTRAN allows such UEs that are in proximity of each other to exchange V2V-related information using E-UTRA(N) when permission, authorization and proximity criteria are fulfilled. The proximity criteria can be configured by the MNO (Mobile Network Operator). However, UEs supporting V2V Service can exchange such information when served by or not served by E-UTRAN which supports V2X Service.

The UE supporting V2V applications transmits application layer information (e.g., about its location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

With regard to V2I communication, the UE supporting V2I applications sends application layer information to the Road Side Unit, which in turn can send application layer information to a group of UEs or a UE supporting V2I applications.

V2N (Vehicle to Network, eNB/CN) is also introduced where one party is a UE and the other party is a serving entity, both supporting V2N applications and communicating with each other via LTE network.

With regard to V2P communication, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P Service can exchange such information even when not served by E-UTRAN which supports V2X Service.

The UE supporting V2P applications transmits application layer information. Such information can be broadcast by a vehicle with UE supporting V2X Service (e.g., warning to pedestrian), and/or by a pedestrian with UE supporting V2X Service (e.g., warning to vehicle).

V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X Service, e.g., RSU, application server, etc.

For this new study item V2X, 3GPP has provided particular terms and definition in TR 21.905, current version 13.0.0, which can be reused for this application.

Road Side Unit (RSU): An entity supporting V2I Service that can transmit to, and receive from a UE using V2I application. An RSU can be implemented in an eNB or a stationary UE.

V2I Service: A type of V2X Service, where one party is a UE and the other party is an RSU both using V2I application.

V2N Service: A type of V2X Service, where one party is a UE and the other party is a serving entity, both using V2N applications and communicating with each other via LTE network entities.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3GPP transport. Based on the other party involved in the communication, it can be further divided into V2V Service, V2I Service, V2P Service, and V2N Service.

Different types of messages are and will be defined for the V2V communication. Three different types of messages have been already defined by ETSI for the Intelligent Transport Systems (ITS), see corresponding European Standards ETSI EN 302 637-2 v1.3.1 and ETSI EN 302 637-3 v 1.2.1:

Cooperative Awareness Messages (CAM), which are continuously triggered by vehicle dynamics to reflect the vehicle status;

Decentralized Environmental Notification Messages (DENM), which are triggered only when vehicle-related safety events occur; and BSM (Basic Safety Messages) related safety Applications are built around SAE J2735 BSM and are tailored for low latency, localized broadcast.

Examples of safety applications are:

| | |
|---|---|
| Forward Collision Avoidance | FCA |
| Emergency Electronic Brake Lights | EEBL |
| Blind Spot Warning | BSW |
| Lane Change Assist | LCA |
| Do Not Pass Warning | DNPW |
| Intersection Collision Warning | ICA |
| Wrong Way Driver Warning | WWDW |
| Cooperative Adaptive Cruise Control | CACC |

Besides, there are other applications such as SPaT (Red Light Running RLR, Left Turn Assist LTA etc.) as defined in e.g., IEEE 802.11-13/0541r0. As the V2V and ITS standardizations are rather at the beginning, it is to be expected that other messages might be defined in the future.

CAMs are continuously broadcast by ITS-Stations (ITS-S) to exchange status information with other ITS-Ss, and thus have a larger impact on the traffic load than event-triggered DENM messages. For this reason, traffic characteristics of CAM messages as defined by ETSI for ITS are considered more representative of V2V traffic. Cooperative Awareness Messages (CAMs) are messages exchanged in the ITS network between ITS-Ss to create and maintain awareness of each other and to support cooperative performance of vehicles using the road network. Point to multi-point communication shall be used for transmitting CAMs, such that the CAMs are transmitted from the originating ITS-S to the receiving ITS-Ss located in the direct communication range of the originating ITS-S.

Different scenarios are foreseen for the exchange of V2X messages. One scenario assumes that the V2X messages are transmitted via the sidelink interface (PC5 interface) directly between multiple vehicular UEs at a local area. Another scenario assumes that the V2X messages are transmitted via the Uu interface to E-UTRAN (eNB) in the uplink, and the E-UTRAN (eNB) in turn transmits it to multiple UEs at a local area in the downlink. To support the latter scenario, E-UTRAN performs uplink reception and downlink transmission of V2X messages. For downlink, E-UTRAN may use a broadcast mechanism. A combination of these two scenarios is possible as well.

Dedicated short-range communications (DSRC) are one-way or two-way short-range to medium-range wireless communication channels specifically designed for automotive use and a corresponding set of protocols and standards. It is currently used for the IEEE 802.11p standard to add wireless access in vehicular environments and to support Intelligent Transportation Systems (ITS) applications.

QoS for V2X Traffic

3GPP has recently started discussing how the QoS requirements can be implemented for the V2X traffic. In terms of latency requirements, V2X message transmission for V2V/P services (either via the LTE-UU interface or via the PC5 interface) has to full the following latency requirement: 100 ms for V2X message delivery from the transmitting UE and to the receiving UEs. Furthermore, stricter requirements may be envisioned for particular usage cases (e.g., pre-crash sensing); for instance the E-UTRAN should be capable of transferring messages between two UEs supporting V2V application with a maximum latency of 20 ms.

A PC5 radio bearer is controlled by the QoS parameters provided from the EPS (Evolved Packet System). Furthermore, the PC5 radio bearer is managed under the control of the E-UTRAN, which in turn obtains the PC5-based QoS parameters from the Initial UE Context Setup from MME. As presently defined, the PC5 bearer QoS profile only includes a PPPP parameter.

It is not yet clear whether and how the various QoS requirements for V2X traffic can be ensured.

Moreover, it will be important to ensure that the coexistence of the V2X traffic with other traffic transmitted via the same interface, i.e., either via the Uu interface or via the PC5 interface, does not cause any problems. Consequently, coordination of the QoS handling and other procedures for V2X traffic and other traffic shall be improved. For V2X-application QoS-requirement fulfilment however, the currently-foreseen mechanisms and parameters might not be enough. The PPPP itself does not necessarily guarantee the Guaranteed BitRate (GBR), Packet Loss minimalism and Packet Delay constraints etc. So, it is likely that other parameters like PBR (Prioritized Bit Rate), BSD (Bucket Size Duration) etc. of Rel. 8. Radio Bearer configuration would be required.

BRIEF SUMMARY

Non-limiting and exemplary embodiments provide an improved vehicular mobile terminal for transmitting both vehicular data and other data.

The independent claims provide non-limiting and exemplary embodiments. Advantageous embodiments are subject to the dependent claims.

Correspondingly, in one general first aspect, the techniques disclosed here feature a vehicular mobile terminal for transmitting vehicular data and other data to one or more receiving entities. A receiver of the vehicular mobile terminal receives an uplink grant from a radio base station controlling the cell to which the vehicular mobile terminal is attached, wherein the uplink grant indicates radio resources usable by the vehicular mobile terminal to transmit the vehicular data and/or the other data. A transmitter of the vehicular mobile terminal transmits the vehicular data and/or the other data using the radio resources indicated in the uplink grant. The vehicular mobile terminal is operative to handle the vehicular data and the other data separately from one another.

Correspondingly, in one general first aspect, the techniques disclosed here feature a radio base station for controlling a vehicular mobile terminal which transmits vehicular data and other data to one or more receiving entities. A transmitter of the radio base station transmits an uplink grant to the vehicular mobile terminal, wherein the uplink grant indicates radio resources usable by the vehicular mobile terminal to transmit the vehicular data and/or the other data. A receiver of the radio base station receives the vehicular data and/or the other data on the radio resources indicated in the uplink grant. The radio base station controls the vehicular mobile terminal such that the vehicular data is handled separately from the other data.

Correspondingly, in one general first aspect, the techniques disclosed here feature a method for a vehicular mobile terminal to transmit vehicular data and other data to one or more receiving entities. The method comprises receiving an uplink grant from a radio base station controlling the cell to which the vehicular mobile terminal is attached, wherein the uplink grant indicates radio resources usable by the vehicular mobile terminal to transmit the vehicular data and/or the other data. The vehicular data and/or the other data is then transmitted using the radio resources indicated in the uplink grant. The vehicular mobile terminal handles the vehicular data and the other data separately from one another.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

DETAILED DESCRIPTION

Figure 1:
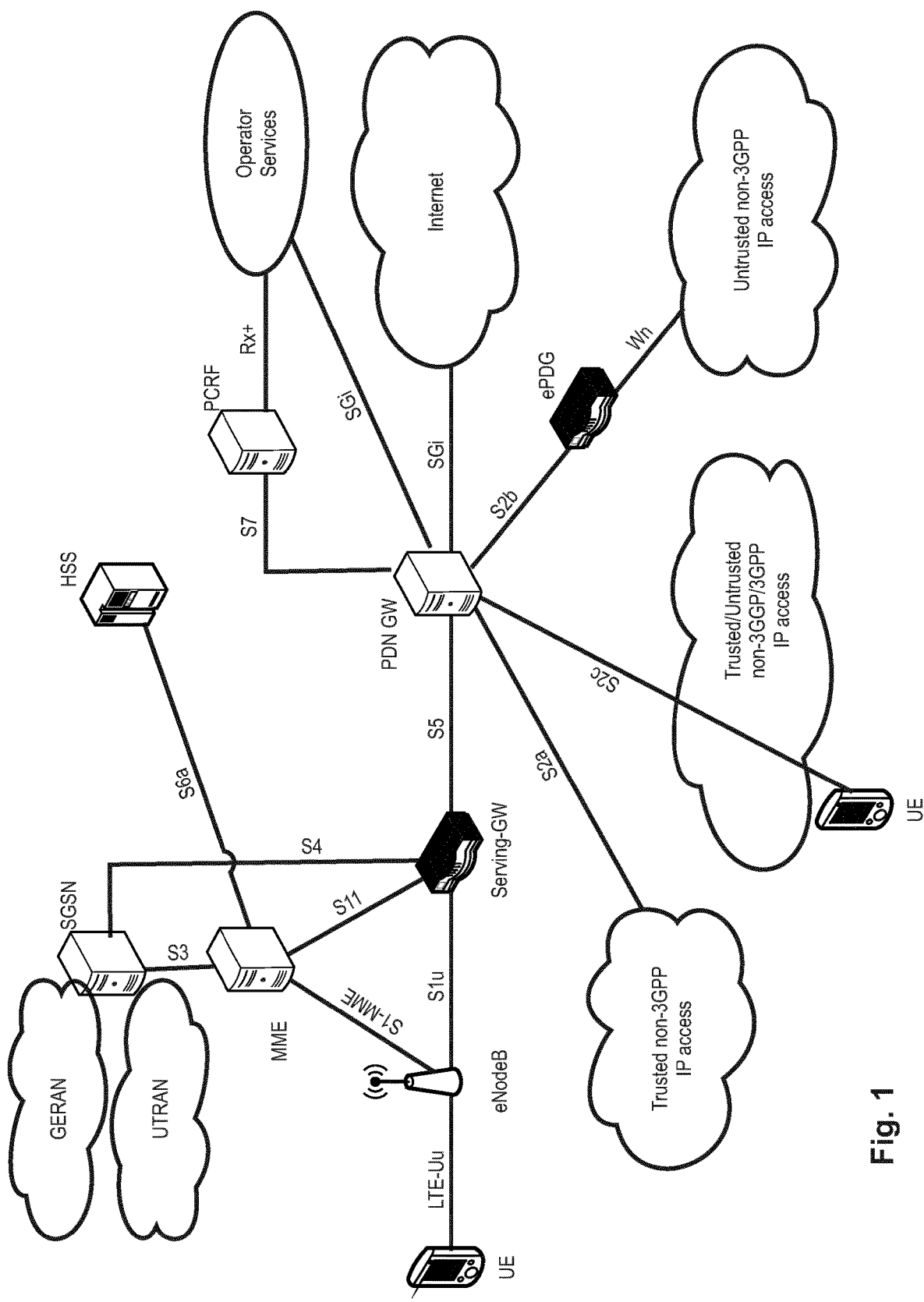
FIG. 1 shows an exemplary architecture of a 3GPP LTE system.
Figure 2:
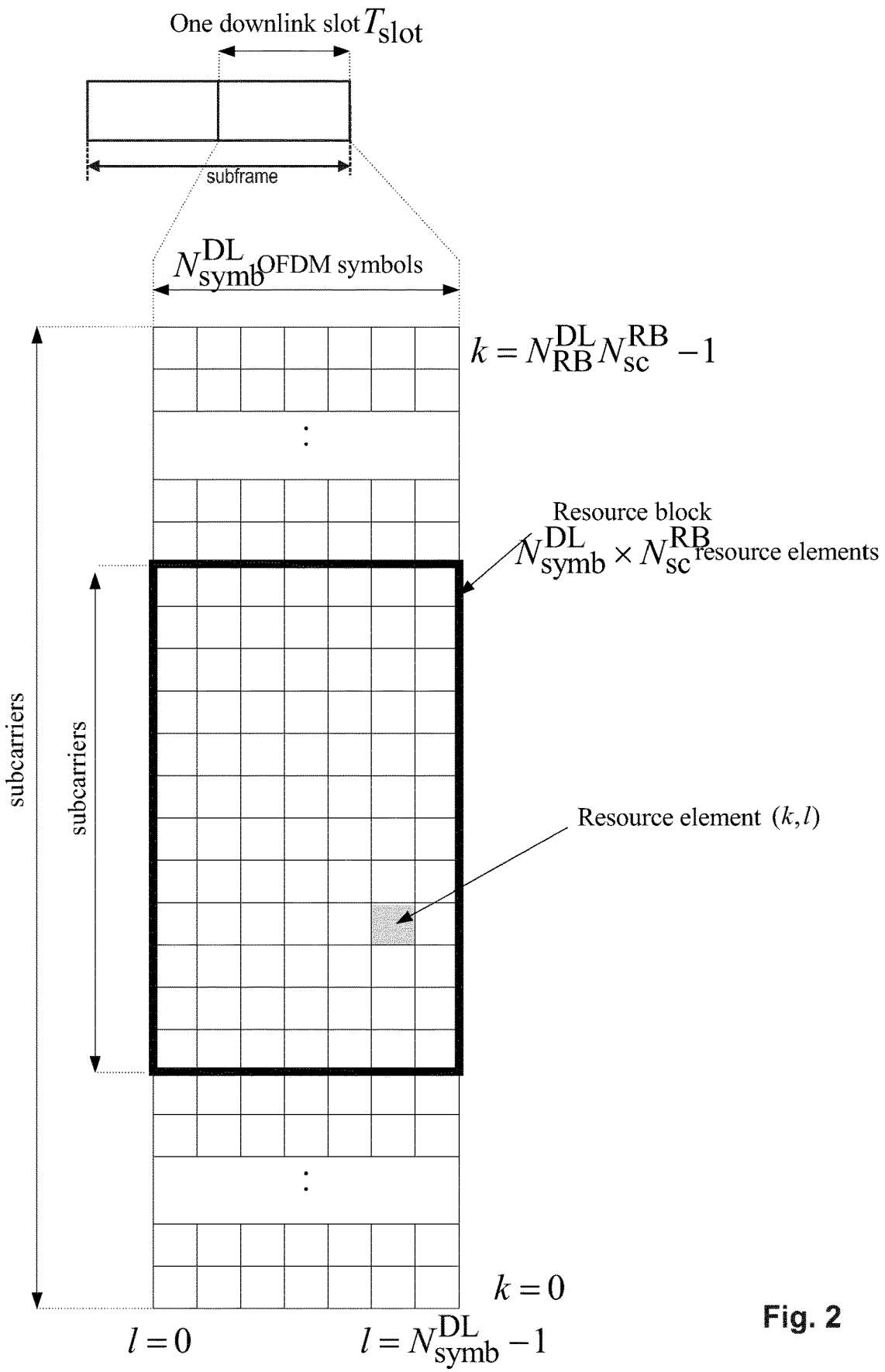
FIG. 2 shows an exemplary downlink resource grid of a downlink slot of a subframe as defined for 3GPP LTE (Release 8/9)
Figure 3:
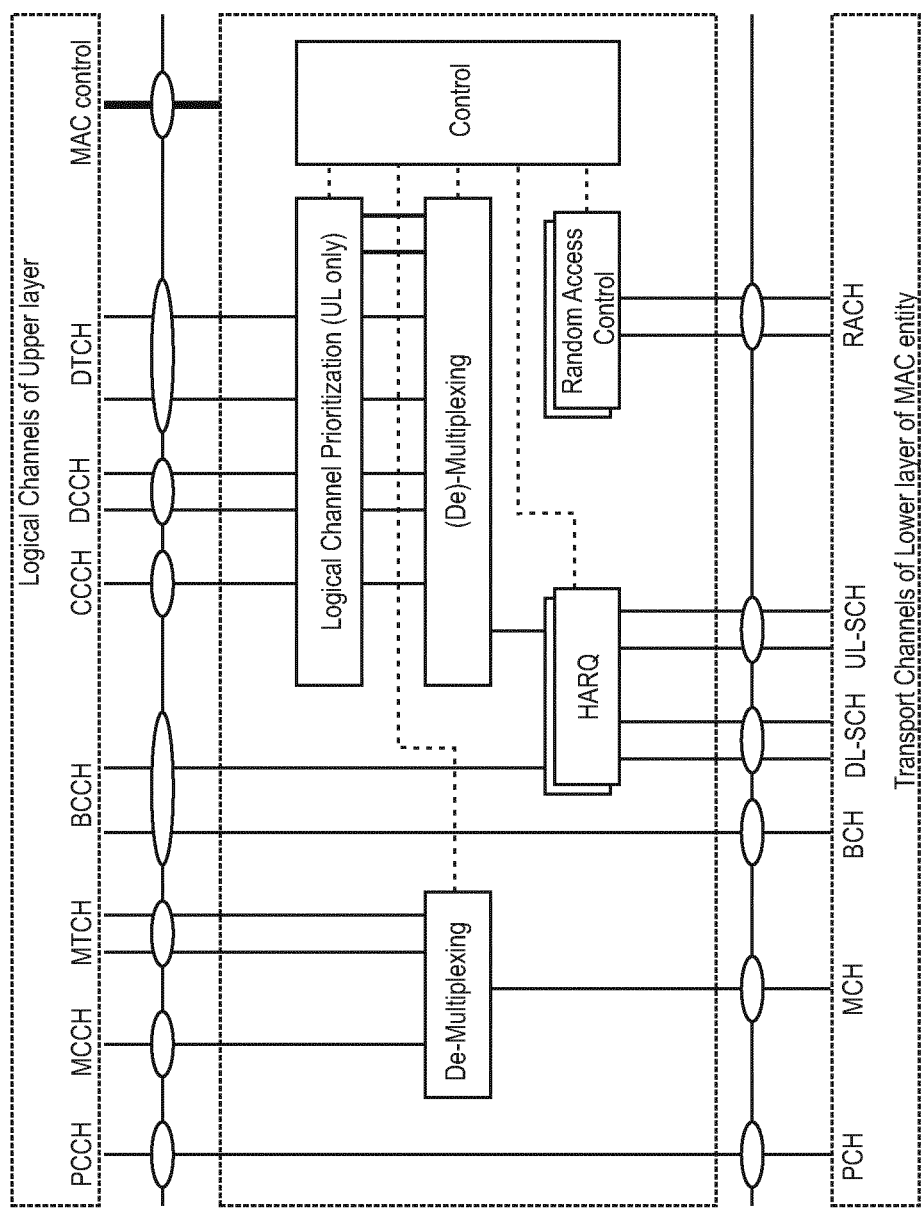
FIG. 3 illustrates an exemplary MAC structure of the UE side, FIG. 4 schematically illustrates how to establish a layer-2 link over the PC5 for ProSe communication.
Figure 4:
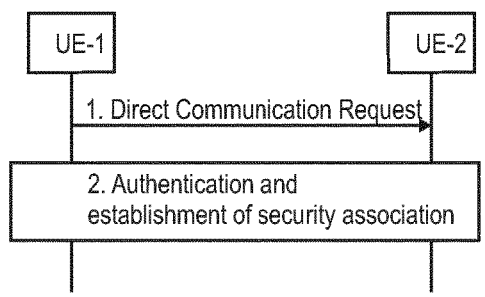
Figure 5:
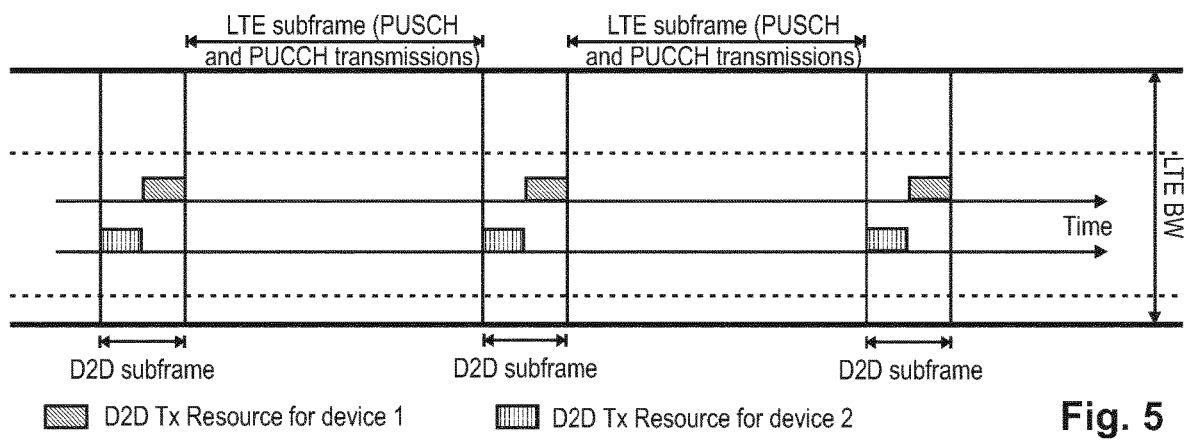
FIG. 5 illustrates the use of transmission/reception resources for overlay (LTE) and underlay (D2D) systems.
Figure 6:
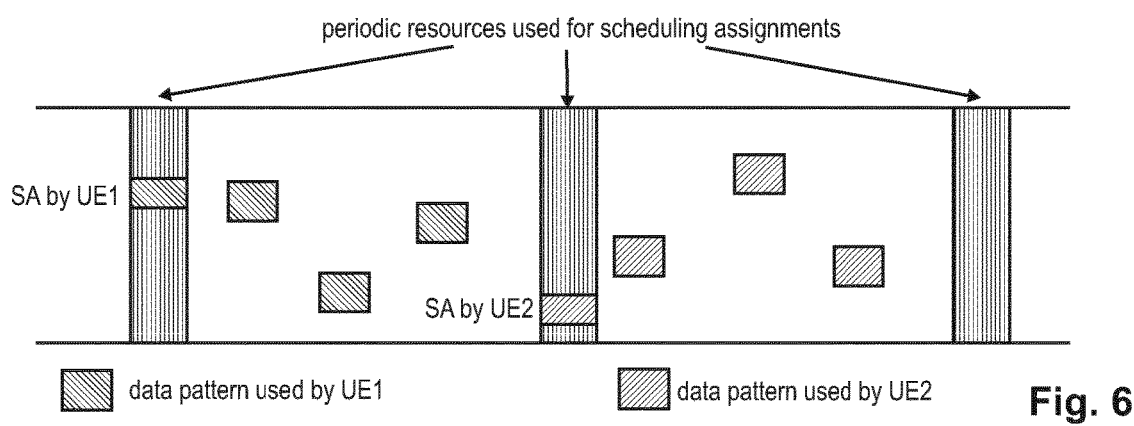
FIG. 6 illustrates the transmission of the Scheduling Assignment and the D2D data for two UEs.
Figure 7:
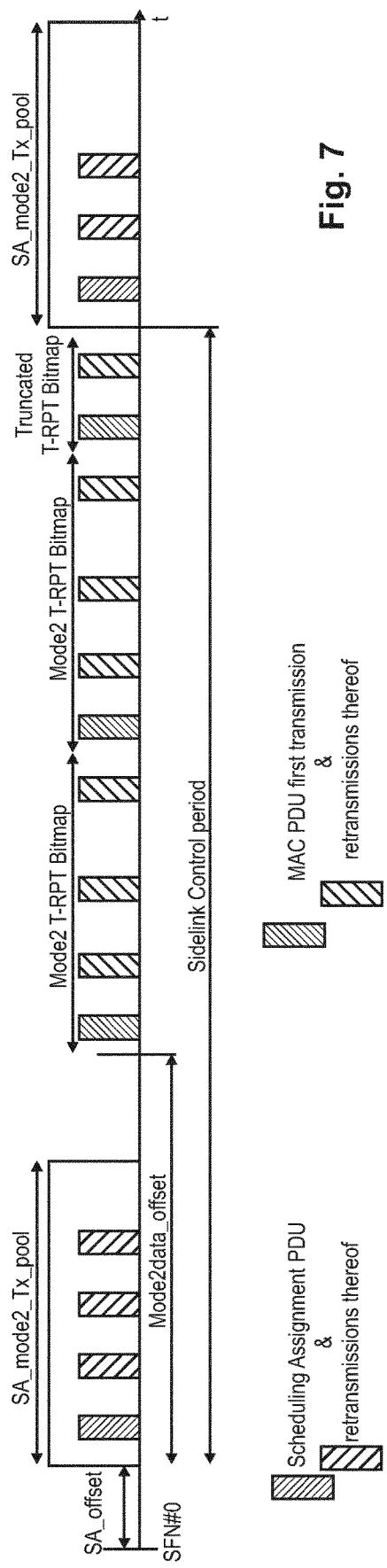
FIG. 7 illustrates the D2D communication timing for the UE-autonomous scheduling Mode 2.
Figure 8:
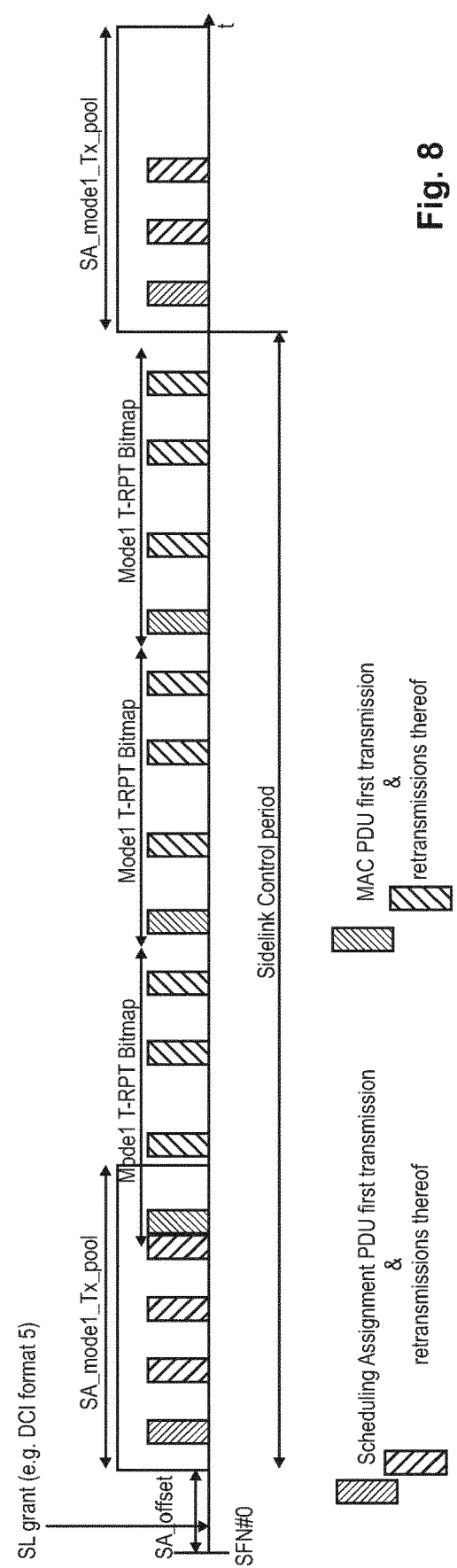
FIG. 8 illustrates the D2D communication timing for the eNB-scheduled scheduling Mode 1.

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "ProSe" or in its unabbreviated form, "Proximity Services", used in the application is applied in the context of Proximity-based applications and services in the LTE system as exemplarily explained in the background section. Other terminology such as "D2D" is also used in this context to refer to the Device-to-Device communication for the Proximity Services.

The term "vehicular mobile terminal" as used throughout the application is to be understood in the context of the new 3GPP study item V2X (vehicular communication) as explained in the background section. Correspondingly, a vehicular mobile terminal shall be broadly understood as a mobile terminal which is specifically installed in a vehicle (e.g., car, commercial trucks, motorcycles etc.) to perform vehicular communication, i.e., passing information related to the vehicle to other entities (such as vehicles, infrastructure, pedestrians) e.g., for the purpose of safety or driver assistance. Optionally, the vehicular mobile terminal may have access to information available at the navigation system (provided it is also installed in the car), such as map information etc.

As explained in the background section, 3GPP has introduced a new study item for LTE-assisted vehicular communication, where the V2X traffic can be exchanged on the Uu interface and/or the PC5 interface. Therefore, the V2X traffic coexists with other traffic that is exchanged respectively via said interfaces and needs to be coordinated. In particular, it is important that the UE still ensures that the QoS (Quality of Service) requirements are fulfilled for the V2X traffic (as well as for the other traffic transmitted on said interfaces). In particular, coexistence issues may arise between V2X traffic and other traffic when:

Using different interfaces (e.g., the V2X traffic via the Uu interface and normal D2D traffic via the PC5 interface);
Both use the PC5 interface (e.g., the V2X traffic and the normal D2D traffic coexist); and
Both use the Uu interface (e.g., the V2X traffic and the normal LTE Uu traffic coexist).

These coexistence issues may be resolved and a proper QoS handling may be ensured by adapting and improving important procedures such the buffer status reporting, performing logical channel prioritization procedures, scheduling of radio resources, or transmitting scheduling requests, etc.

The following exemplary embodiments are conceived by the inventors to mitigate one or more of the problems explained above.

Particular implementations of the various embodiments are to be implemented in the wide specification as given by the 3GPP standards and explained partly in the background section, with the particular key features being added as explained in the following various embodiments. It should be noted that the embodiments may be advantageously used for example in a mobile communication system, such as 3GPP LTE-A (Release 10/11/12/13) communication systems as described in the Technical Background section above (or later releases), but the embodiments are not limited to its use in these particular exemplary communication networks.

The explanations should not be understood as limiting the scope of the disclosure, but as a mere example of embodiments to better understand the present disclosure. A skilled person should be aware that the general principles of the present disclosure as laid out in the claims can be applied to different scenarios and in ways that are not explicitly described herein. For illustration purposes, several assumptions are made which however shall not restrict the scope of the following embodiments.

The various embodiments provide an improved handling and transmission of V2X data as well as other data by a (vehicular) UE, selectively improving different procedures such as the resource scheduling, the LCP procedure, Buffer Status Reporting, transmission of scheduling requests etc., as will become apparent from the description. Therefore, other functionality (i.e., functionality not changed by the various embodiments) may remain exactly the same as explained in the background section or may be changed without any consequences to the various embodiments. This includes, e.g., other procedures relating to how the actual transmission of the V2X or other data is performed by the vehicular UE after the vehicular UE is allocated with suitable radio resources, or how the vehicular UE is configured for transmission of V2X data, or the particular content of the V2X data etc.

First Embodiment

In the following a first embodiment for solving the above-mentioned problem(s) will be described in detail. Different implementations and variants of the first embodiment will be explained as well.

Exemplarily, a vehicular UE is assumed which is installed in a vehicle and is capable of performing vehicular communication based on the D2D framework as explained in the background section of this application (i.e., via the PC5 interface) as well as based on the LTE framework for the Uu interface.

One assumption is that the vehicular UE is able to transmit the V2X traffic on both interfaces (LTE-UU and PC5) separately or even at the same time. In order to guarantee the QoS requirements for the V2X traffic, the resource allocation and/or the processing of the resource allocation in the vehicular UE should distinguish between the V2X traffic and the other coexisting non-V2X traffic (i.e., the normal D2D traffic or the normal LTE UU traffic depending on the interface used for transmitting the V2X traffic). More in particular, it should be possible to control V2X-related traffic separately from other traffic so as to ensure that the strict V2X QoS requirements can be met. There are several different possibilities on how the eNodeB and the vehicular UE can interact with each other so as to ensure that the QoS requirements of V2X traffic data are fulfilled, as will be presented in the following.

According to an exemplary implementation of the first embodiment, the eNodeB may issue an uplink grant specific to only V2X traffic, such that the radio resources indicated in said uplink grant are to be used to transmit vehicular data but not non-vehicular data. Consequently, such uplink radio resource allocation can already distinguish between V2X and non-V2X traffic thereby allowing the eNodeB to control what the UE is to transmit first to potentially meet any QoS requirements. For example, in case vehicular data shall be transmitted first, the eNodeB may correspondingly issue a V2X-specific uplink grant thereby allowing to fulfill the strict latency requirements for vehicular traffic.

A vehicular-data-specific uplink grant can be implemented exemplarily as follows. A new V2X-specific RNTI can be provided for vehicular UEs (in addition to the usual C-RNTI used for scheduling). For example, this V2X-specific RNTI can be signaled (configured) to the UE while establishing the first radio bearer that is intended to carry the V2X related traffic. This is typically done after the MME has signaled the QOS/QCI for the V2X bearer establishment to the eNB. The V2X-specific RNTI may be stored in the UE until the last V2X related application is closed; or, alternatively, even after the closure of the last V2X related application, the V2X-specific RNTI may still be stored and may be reused when a new V2X application is launched and corresponding bearer is being established within the lifetime of this RRC Connection. As a further enhancement, a V2X-specific RNTI might be allocated (configured) for each V2X specific application, e.g., one each for BSM, CAM, DENB, SPaT and so on.

The V2X-specific RNTI is used by the eNB to scramble the uplink grant, such that when the UE successfully decodes the uplink grant using the special V2X-specific RNTI, it will know that the indicated radio resources are to be used for transmitting vehicular data but not non-vehicular data. For example, the eNodeB scrambles a sidelink uplink grant (e.g., DCI Format 5; see background section) by using the V2X-specific RNTI, instead of the SL-RNTI, so as to allocate radio resources for transmission of vehicular data. Similarly, the eNodeB scrambles a normal uplink grant (i.e., for the UU interface) (e.g., DCI Format 0; see background section) by using the V2X-specific RNTI, instead of the C-RNTI, so as to allocate radio resources for transmission of vehicular data. Of course, the eNodeB can also schedule uplink grant in a normal manner (i.e., using the C-RNTI/SL-RNTI) such that the UE can use the indicated radio resources for only the non-vehicular data (and possibly also the vehicular data as will become apparent later).

Alternatively, instead of defining a new RNTI specifically for V2X traffic, the already existing uplink grants may be adapted to allow the UE to distinguish whether the indicated radio resources are to be used for transmission of the vehicular data only, or not. Suitable information in said respect can be included for example in a separate field of the uplink grant, be it the DCI Format 0 or DCI Format 5. This new field can be carved out of re-adjustment of some of the existing fields (e.g., shortening some field or specifying new meaning to an existing field) and thereby possibly requiring a new DCI format altogether.

Alternatively, some already existing fields of the uplink grants can be reused so as to define a codepoint which is then identified by the UE to mean that the indicated radio resources are to be used for vehicular data only and/or for non-vehicular data. For example, some of the codepoints in the existing fields that are not meaningful or have a reserved value for legacy LTE traffic (corresponding to UE's C-RNTI) can be used for this purpose. Examples of such possible fields would be Resource block assignment, MCS and RV, UL index (TDD only), DAI etc. Some combination of the codepoints across more than 1 of these fields—a combination which would not be meaningful or would have an expected value for legacy LTE traffic (corresponding to UE's C-RNTI) can be also used for this purpose. E.g., for TDD specific fields can be readily used for this new purpose (to indicate a grant for V2X) in the FDD system. However, the easiest way would be to have defined a new V2X-specific RNTI as discussed earlier or to design a new DCI format altogether.

According to further exemplary implementations of the first embodiment, the logical channel prioritization procedure can be adapted to assist in securing the QoS requirements for V2X traffic. As presented in the background section, the LCP procedure is used by the UE for allocating radio resources (indicated by an uplink grant or autonomously selected from a radio resource pool) to various logical channels for generating a transport block. The LCP procedure of this implementation is thus adapted so as to allow separate handling of V2X data, if necessary to fulfill any QoS requirements. For instance, the LCP procedure already standardized for the UU interface or the D2D interface could be adapted so as to only consider the specific logical channels carrying the traffic type(s) (Non-V2X and/or V2X) for which the uplink grant is intended; e.g., the other logical channels are disregarded, as far as resource allocation is concerned, during the LCP procedure. For instance, in case a V2X-specific uplink grant is received by the UE, then the LCP procedure would be performed by the vehicular UE by considering the V2X logical channels only (i.e., those LCs that carry the vehicular data) thereby generating a transport block that carries the vehicular data (but not the other coexisting data to be transmitted on that interface). Conversely, in case a non-V2X-specific (i.e., a normal) uplink grant is received by the UE, then the LCP procedure would be performed by the UE by considering the non-V2X logical channels only (i.e., those logical channels that carry the non-vehicular data) thereby generating a transport block that carries the other data (but not the vehicular data). The distinction between the V2X and non-V2X logical channel can be achieved by a variety of means including:

- use of a flag to indicate V2X or non-V2X bearer at the time of bearer configuration (in the message RRC Connection Reconfiguration);
- use of "special" priority (logical channel priority) or PPPP—which are not defined/available in legacy; and mapping all logical channel belonging to V2X to a separate LCG with an LCGID that is not defined/available in legacy.

Moreover, the LCP procedure can also be performed in the usual manner, thereby considering all logical channels, i.e., the vehicular logical channels as well as the other logical channels, such that the generated transport block carries both vehicular data and the other coexisting data in this case separate handling of the V2X traffic can still be ensured by use of LC priorities as will be explained later.

Thus, the LCP procedure performed by the UE when generating a transport block to be transmitted could be used commonly for vehicular and/or non-vehicular data by selectively considering/disregarding particular logical channels depending on which traffic is to be transmitted. On the other hand, separate LCP procedures may be provided for handling vehicular data and for handling other non-vehicular data; a specific V2X LCP procedure could handle assigning resources to the V2X logical channels, while the usual LCP procedure would only handle the assignment of resources to the usual non-vehicular logical channels.

Moreover, the LCP procedure that is foreseen to be performed by the UE when generating a transport block to be transmitted via the PC5 interface is much simpler than the LCP procedure defined for the UU interface in that only the LC priorities (e.g., the PPPP) are considered (see background section). According to further improved implementations of the first embodiment, a specific V2X LCP procedure for the PC5 interface may be provided which is adapted to not only consider V2X logical channels but also consider additional QoS parameters, for instance, some or all of the QoS parameters (apart from PPPP) already used for the UU interface LCP procedure, i.e., the PBR and BSD, Bucket Size Duration parameters as in legacy for LTE specific Logical Channel Prioritization.

The D2D LCP procedure of this implementation improves the QoS handling for the vehicular traffic. For example, the PPPP are typically assigned by the application and thus not under control of the eNodeB, which however might not be sufficient for V2X traffic where the eNodeB should be in control so as to ensure the quality of service. Consequently, by extending the D2D LCP procedure with QoS parameters, in addition to the PPPP, the strict QoS requirements can be fulfilled.

According to a further improvement of the above discussed LCP procedures, the indicated radio resources of an uplink grant shall be utilized as much as possible. In particular, there might be cases where the allocated radio resources are larger than actually necessary to transmit the vehicular data; e.g., there are 80 bytes of vehicular data although the grant allocates 100 bytes. In such cases, the vehicular UE can fill the transport block with padding; e.g., the remaining 20 bytes are padded such that the resulting transport block does not carry other data (i.e., no multiplexing of different traffic types). Although on the PC5 interface multiplexing of D2D and V2X data should be possibly avoided considering the different recipients, on the UU interface the eNodeB is the same recipient for both the LTE-UU data and the V2X data. Consequently, instead of filling the transport block for the remaining radio resources with only padding, the improved LCP procedure performed by the UE for an LTE-UU transmission could additionally consider the normal LTE-UU logical channels (e.g., in a decreasing order of LC priority, e.g., during another LCP procedure started with the remaining radio resources) such that the remaining 20 bytes of the transport block are used to carry LTE UU traffic data. Then, the eNodeB receiving this transport block can distinguish between V2X traffic and the normal LTE UU traffic and continue processing same separately.

According to further exemplary implementations, the V2X logical channels may also be assigned with particular priorities to be used during the LCP procedure to allow separate handling of the V2X LCs. The priority is assigned to the V2X logical channels under control of the eNB and may depend on the content of the data carried via said V2X logical channel. For example, the PPPP of data packets defined in connection with sidelink data can be reused to define the priority of the logical channel. The currently-standardized range of priorities is 1-8, wherein priority 1 is the highest priority and priority 8 is the lowest priority. Exemplary, the priorities for V2X LCs could be one of these 8 already-standardized LC priorities and could be reserved by the eNB for V2X logical channels. Thereby, it is also possible to separate V2X logical channel from other logical channels. For example, assuming that V2X traffic should be prioritized, the eNB could decide to assign the LC priority 1 to all V2X LCs; or to assign LC priorities 1, 2, 3 to V2X logical channels to further allow prioritization among V2X logical channels (e.g., between CAM, DENM, BSM messages).

Alternatively, it may be possible to define new logical channel priorities for the V2X-logical channels that are different from priorities 1-8 already defined for the non-vehicular logical channels. In one exemplary implementation, three different priorities may be distinguished, e.g., priorities 9-11, where, e.g., priority 9 is assigned to a V2X logical channel carrying CAM, priority 10 is assigned to a V2X logical channel carrying DENM, and priority 11 is assigned to a V2X logical channel carrying BSM, wherein priority 9 is the highest among the priorities 8-11, and 11 is the lowest priority among the priorities 8-11. Exemplarily, each of the priorities 9-11 may be understood by the UE to have a higher priority than any of the other priorities 1-8, with the effect that V2X traffic is always prioritized over the other data traffic (be it LTE-Uu traffic or D2D traffic). Alternatively, only priority 9 and/or priority 10 can have the meaning of being higher in priority than any of the other priorities 1-8.

Of course, these are only examples and other priorities and assignments of the priorities are possible as well. For instance, a separate logical channel priority (e.g., priority 12) can be provided to V2X logical channels which carry V2X data that is not related to safety which priority can then be interpreted by the UE between any of priorities 1-8 (may be configured correspondingly by eNB). Alternatively, this logical channel carrying non-safety V2X-data could also be assigned any of the existing priorities 1-8 depending on the content and its relative priority to other data.

In any case, the above-discussed LC priorities to be suitably used during the LCP procedure is a further mechanism that allows a separate handling of V2X traffic and thus may be used by the eNB to make sure that the QoS requirements for the V2X data are met.

In the above, several mechanisms were discussed on how to achieve that the V2X traffic is handled separately from other coexisting traffic to be transmitted over the same interface. These different mechanisms can also be combined, i.e., performed together by the vehicular UE (under control of the eNB), if appropriate. For example, which particular mechanism(s) to use might depend on the interface (PC5 or UU) over which the V2X data is to be transmitted, as will be explained in the following.

At first the UU interface between the vehicular UE and the eNodeB is assumed over which multiplexing of both traffic types (i.e., vehicular traffic and other LTE UU traffic) might be possible. In order to separately handle the vehicular traffic, the eNodeB for instance could provide separate grants, i.e., one for allocating radio resources for transmitting the vehicular data and another one for allocating radio resources for transmitting the other data. Correspondingly, the LCP procedure (either a commonly used one or a separate, V2X-specific, LCP) would be performed by only considering the logical channels carrying the vehicular data, while disregarding the other logical channels such that transport blocks are generated that only carry vehicular data. As already explained above, in cases where the allocated resources are larger than the data to be transmitted, padding may be used or exceptionally the transport block may be filled with data of the other traffic type (i.e., LTE Uu traffic) so as to maximize usage of the indicated radio resources.

Nevertheless, also when the eNodeB issues common grants (i.e., grants allocating radio resources usable for both vehicular and non-vehicular data), it is still possible for the UE to separately handle that the V2X traffic to be transmitted via the UU interface. For example separate LCP procedures may be foreseen to handle the vehicular data and the usual LTE UU data, such that the UE decides which traffic type should be served first (e.g., based on priorities of the corresponding logical channels wherein the traffic (V2X or non-V2X) belonging to the highest prioritized logical channel among all logical channels is the "winning" traffic to be served first) and thus performs the corresponding LCP procedure by only considering those logical channels for which it decided to transmit data. Further, even when using a common LCP procedure it is still possible to separately handle the two traffic types, namely by suitably assigning priorities to the logical channels carrying the vehicular data, as explained above. Correspondingly, the common LCP procedure would be performed by allocating the radio resources indicated in the common grant to logical channels in a decreasing order of priority, but where the priority of vehicular logical channels is considered too.

Now assuming the PC5 interface for which multiplexing of both traffic types shall be avoided, one or a combination of mechanisms can be assumed as already explained in detail for the UU interface, with the possible exception of those where multiplexing of both traffic types would happen. For instance, in those cases where the allocated radio resources are larger than the data to be transmitted, padding the transport block need to be performed in view of that one transport block transmitted over the PC5 interface should carry data of only one traffic type (either the vehicular data or the usual D2D data).

According to further implementations of the first embodiment, the buffer status reporting procedure configured for the vehicular UE is improved as follows. The vehicular UE shall generate a buffer status report that indicates the amount of vehicular data that is available for transmission in such a manner that it is separately indicated from other data available for transmission (such as LTE-Uu traffic or the normal D2D traffic). It is thus possible for the eNB to learn how much vehicular data the UE would like to transmit and use this information for efficient radio resource scheduling. This also facilitates that the specific QoS requirements for V2X traffic may be fulfilled by the eNodeB. For instance, depending on the particular variant of the embodiment, the eNB might issue a V2X-specific uplink grant if a significant amount of vehicular data is available for transmission to make sure that the vehicular data is transmitted first.

Although not mentioned above, it is assumed that the V2X traffic uses either the PC5 interface or the UU interface, such that the buffer status reporting is unambiguous as to whether the reported buffer status refers to data available for transmission over the PC5 or UU interface.

However, the separate buffer status reporting can also be performed in those cases where the vehicular UE is performing transmission of V2x data via both the PC5 and the UU interface. To begin with, it should be noted that the eNodeB is aware of whether a V2X logical channel (for which the buffer status is reported) is set up for the PC5 or UU interface. Consequently, when assigning logical channels to particular logical channel groups, the eNodeB might already distinguish between logical channels being transmitted over the PC5 or the UU interface, by assigning those logical channels to separate LCGs. Alternatively, separate buffer status reports can be transmitted by the UE respectively for the PC5 interface or the UU interface.

Moreover, assuming buffer status reporting for the UU transmissions in a particular exemplary variant this may be implemented by defining at least one specific Logical Channel Group for the buffer status reporting, e.g., a V2X-specific LCG to which some or all of the V2X logical channels are assigned. Which V2X logical channels are assigned to this V2X-specific LCG(s) can be configured by the eNB. For example, high-priority safety V2X messages can be assigned to this V2X LCG group (e.g., LCG ID 1) whereas other V2X messages (e.g., non-safety) having a lower priority are assigned together to a further V2X LCG group (e.g., LCG ID2). As apparent, in this example already defined LCGs with IDs 1 and 2 can be reserved by the eNodeB for V2X, such that only the remaining LCGs with IDs 0 and 3 are available for grouping the remaining non-V2X logical channels.

In one example, the legacy (long) BSR reporting as mentioned in the background section (section "buffer status reporting") could be exemplarily used to carry separately the buffer status of the V2X logical channels and the buffer status of the remaining, non-V2X, logical channels. For each LCG, a corresponding buffer size field is provided in the legacy BSR MAC CE (see TS 36.321 subclause 6.1.3.1).

Alternatively, the total number of four LCGs may not be enough for the buffer status reporting, especially in scenarios where the "other traffic" (i.e., like LTE UU traffic) requires more reserved LCGs or where some of the V2X applications like BSM, CAM, DENM, SPaT etc. require their own specific buffer occupancy reporting. In such cases, at least 3 bits may be exemplary provided for the LCG-ID so as to distinguish at least 8 LCGs. In said respect, a new BSR MAC CE might need to be defined so as to be able to carry more buffer size fields.

Another possible way to achieve this separate buffer status reporting would be to have a separate BSR reporting only for vehicular traffic purposes, e.g., providing a new MAC CE (different from the already-defined BSR MAC CE) with a new LCID (e.g., called "V2X BSR MAC control element" or "vehicular BSR MAC control element"). In a similar manner as for the legacy buffer status reporting, there could be two versions of this BSR (e.g., normal or full and truncated vehicular BSR MAC control element). The table below shows the new BSR types "Vehicular BSR" and "Truncated Vehicular BSR".

| Index | LCID values |
| --- | --- |
| 00000 | CCCH |
| 00001-01010 | Identity of the logical channel |
| 01011 | CCCH |
| 01100-10011 | Reserved |
| 10100 | Truncated Vehicular BSR |
| 10101 | Vehicular BSR |

-continued

| Index | LCID values |
| --- | --- |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In an exemplary implementation, a vehicular BSR MAC control element with reserved LCID, carries the buffer occupancy for each separate V2X application in its own specific LCG, i.e., eNB configures mapping between specific bearers (logical channel IDs) and LCG IDs while optionally configuring explicitly (e.g., using a flag) the V2X bearer(s)/Logical Channel. This flag helps in the running the LCP procedure when the priorities allocated to V2X bearers are indistinguishable from the priorities allocated to normal LTE bearers.

Figures 9, 10:
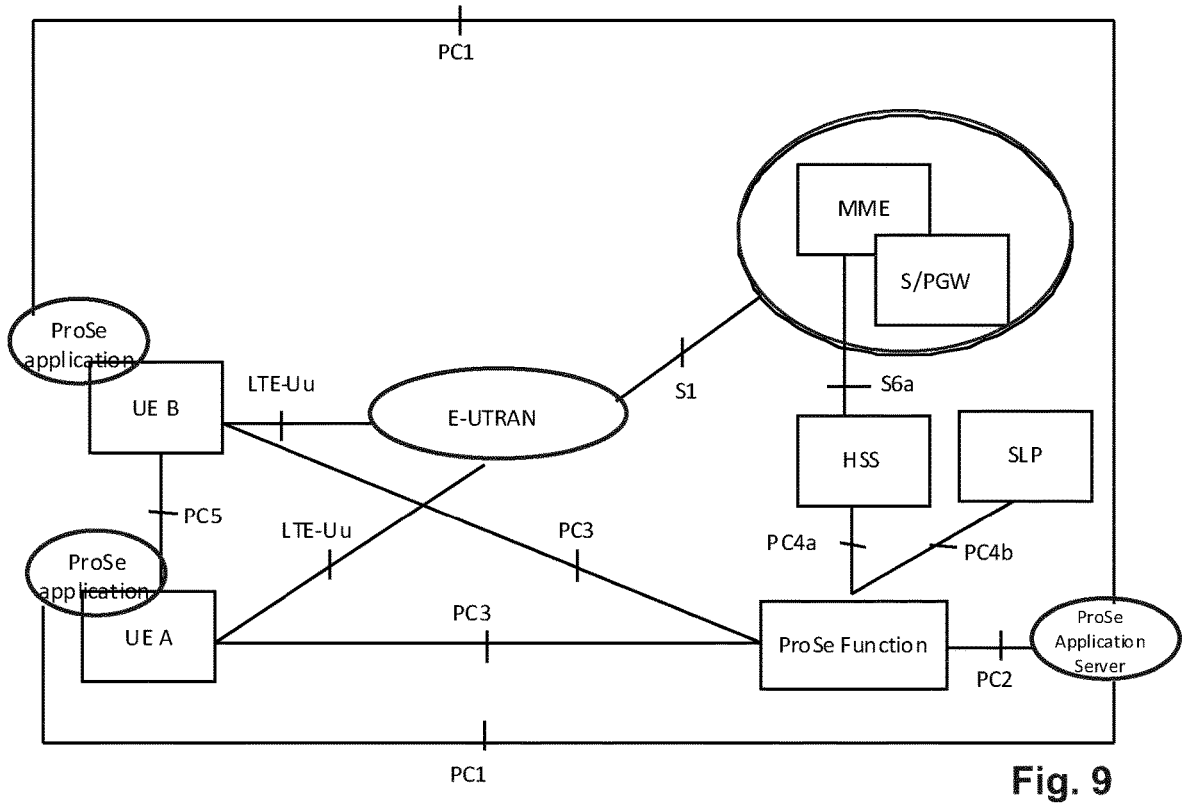
FIG. 9 illustrates an exemplary architecture model for ProSe for a non-roaming scenario.
FIG. 10 illustrates an exemplary ProSe buffer status report MAC control element for an even number of ProSe destination groups.

As for the PC5 interface, for example:
the existing MAC control element for Sidelink BSR (SL BSR; see e.g., FIG. 10) is used such that LCG IDs for V2X bearers and legacy Rel. 12/13 are separately configured, e.g., it is configured that that bearers for V2X are mapped to LCGID 1 and bearers for legacy sidelink are mapped to LCG-ID 2. For the former (V2X bearers), the Destination Index field identifies the V2X Destinations including the broadcast destination which is intended to be received by all nearby vehicles. For the latter (legacy sidelink), the Destination Index field identifies the ProSe Destination; and
alternatively, there is a new MAC control element for Sidelink Vehicular BSR, used as described above for the Uu case. This may or may not require any Destination Id field. The destination Id field can also have a different length compared to SL BSR.

According to further implementations of the first embodiment, the scheduling request procedure used by a UE that has not enough radio resources to perform a V2X transmission is improved. So far, the scheduling request (e.g., 1bit) is transmitted by the UE without providing any information about the type or priority of data which triggered the transmission of the scheduling request. According to an improvement, a V2X-specific scheduling request is provided for requesting radio resources from the eNodeB. In particular, the specific scheduling request would indicate that the requested radio resources are to be used to transmit vehicular data, thus providing information to the eNodeB; or put differently that the specific scheduling request was triggered by V2X data becoming available. This can be exemplarily implemented by using a different RRC configuration configuring another (probably one or more) SR configuration and indicating for each SR configuration its purpose, e.g., LTE traffic or (specific) V2X traffic.

The eNodeB would thus learn that the scheduling request was triggered by vehicular data and can use this information for a more efficient radio resource scheduling.

A further variant builds on this V2X-specific scheduling request and further assumes that the eNodeB is aware of the possible amount of data that the vehicular UE wants to transmit. For instance, the eNodeB knows that periodic data of a particular size is transmitted by the UE, and thus can provide the vehicular UE—already in response to the V2X-specific scheduling request—with an uplink grant that is sufficient to transmit the vehicular data that triggered the scheduling request. Correspondingly, the vehicular UE would not have to first transmit a buffer status report to the eNodeB so as to be granted further radio resources so as to then transmit the vehicular data as given by the usual SR procedure. This avoids delays and saves radio resources since only one uplink grant is to be transmitted and the buffer status report need not be transmitted.

As explained in the background section, D2D communication also allows a Mode-2 radio resource allocation (UE-autonomous scheduling), where the (vehicular) UE is configured with at least one radio resource pool, each pool respectively indicating radio resources usable for performing a D2D transmission via the PC5 interface. If so configured, instead of (requesting and) receiving an UL grant from the eNB, the UE can create an UL grant of its own by autonomously selecting radio resources from a resource pool, which can then be used to transmit any data available for transmission.

Similar mechanisms as already explained above can be implemented for PC5 Mode 2 scheduling. It should be noted that V2X traffic and other D2D traffic should—if possible—not be multiplexed in one transport block (i.e., data packet) in view of that the respective recipients would be different (i.e., other vehicular entities respectively other D2D UEs). For instance, the vehicular UE may create a "common" UL grant or a V2X-specific UL grant. It may depend on the implementation, whether the UE selects a common or V2X-specific UL grant; e.g., the UE in said respect may exemplarily consider the amount and/or priority of the D2D and V2X data to decide whether a common or V2X-specific UL grant is selected. In general, the UE may need to decide whether to transmit V2X data or normal D2D data in the next transmission opportunity. This selection can be based on the PPPP of data packets in the two traffic types; e.g., the traffic type having the highest priority among it is selected to be transmitted first. In addition or alternatively, some predefined rule(s) could be applied within the vehicular UE, e.g., that V2X data is always prioritized over normal D2D data, or that V2X safety messages are always prioritized over normal D2D data.

In any case, as mentioned before, separate uplink grants can be selected by the UE, such that the UE will carry out the LCP procedure by selectively considering only those LCs depending on the selected type (i.e., D2D or V2X) of the grant. However, even when having a common UL grant, it is still possible to handle the V2X traffic differently from the other data traffic (in this case the normal D2D traffic to other D2D UEs). Then, after having determined which traffic type to transmit first, a suitable LCP procedure can be performed by the vehicular UE. For instance, in case legacy D2D data is selected, the D2D legacy LCP procedure as explained in the background section can be performed, additionally however considering only the normal D2D logical channels but not the V2X logical channels during the LCP, such that the generated transport block will not comprise the V2X data as well. On the other hand, in case V2X data is to be transmitted first, either the already-existing D2D LCP procedure can be performed (in this case disregarding the normal D2D logical channels during the LCP), or a specific V2X-LCP procedure is performed, which might not only consider the PPPP (LC priority) but also additional QoS parameters (such as the PBR, or Bj, etc.) as already explained above.

According to another implementation, radio bearers established on the UU interface for the transmission of vehicular related traffic shall be distinguished from other legacy LTE radio bearers for instance by being associated with a specific identifier, e.g., a specific LC ID or a specific range of LC IDs (e.g. LCID 10-15 are reserved for vehicular radio bearers). In addition, or alternatively, a flag may be provided in the RRC Connection Reconfiguration message while establishing a bearer so as to identify same as a vehicular bearer. In addition or alternatively, special logical channel priority values which unambiguously identify the radio bearer as a vehicular radio bearer can be provided.

According to still another embodiment, the V2X traffic is further separated in safety and non-safety messages and then transmitted differently so as to distinguish them. In particular, safety and non-safety messages are transmitted on different carrier frequencies. For instance, safety messages can be transmitted on the shared carriers (e.g., 5.9 Ghz of PC5), while non-safety messages can be sent on the current operator-owned carriers; or vice versa.

According to still another implementation, the UE behavior for Semi-persistent scheduling (SPS) grants is improved. In order to decrease the signaling overhead on Uu to send grants to the UE on (E)PDCCH (and to decrease the overhead from a preceding BSR), SPS can be used to allocate periodic PC5 radio resources to the UE intending to make V2X transmissions since some of the V2X messages (safety messages like BSM, CAM, DENM etc.) are mostly periodic. However, the periodicity of the vehicular data is not strictly periodic such that packet generation (unlike VoIP) does not follow a strict periodic time schedule but may somewhat "hover around" the periodic intervals (e.g., depending on the speed changes by the vehicle).

Thus, if the eNB configured SPS resources to occur every 100 ms, i.e., at time instances t, t+100, t+200, t+300 . . . , but the vehicular data becomes available for transmission somewhat before the time instance (e.g., at t+90), then the current UE behavior would trigger an additional request for radio resources (e.g., a SR triggered by this vehicular data) so as to transmit the vehicular data at the next possible transmission opportunity.

However, the SPS allocation for the vehicular data was configured to fulfill the QoS requirements of said data, such that transmitting the vehicular data by using these additionally-requested radio resources is not advantageous but rather wastes radio resources since additional radio resources had to be scheduled and were used to transmit the vehicular data ahead of time. In order to avoid this UE behavior, the following implementation is provided:

1) When the periodic vehicular data becomes available for transmission shortly before the transmission opportunity provided by the SPS allocation, the UE should buffer the data until the SPS transmission opportunity (the above example at t+100) so as to then transmit the buffered vehicular data using the SPS resources;
2) Also, this periodic vehicular data should not trigger a SR/BSR, since the corresponding dynamic allocation requested thereby should be avoided;
3) On the other hand, other data becoming available for transmission might still trigger the scheduling request and the transmission of the buffer status report as commonly used, as if the SPS resource for the vehicular data would not exist;
4) Furthermore, dynamic grants which are available to the UE should also not be used for transmitting this particular periodic vehicular data, since the SPS radio resources were specifically configured in said respect;

5) Conversely, the SPS radio resources configured for the periodic vehicular data should also not be used to transmit other, non-vehicular, data;

6) If there is more than one V2X SPS-configured resource allocation, then the above rules should be followed for each—considering everything else as "other data"; and 7) As an alternative to 5), only non-V2X data should be considered as "other data" i.e., at t+100 it would be allowed to transmit/multiplex data from other V2X application.

For Mode2 (UE selected grants), the above rules apply to the UE also with regards to UE selection of grants for V2X data transmission.

In this connection, depending on the context, the term "other data" could mean one or more of LTE traffic, Rel. 12/13 PC5 traffic (e.g., commercial or Public Safety), V2X data from "other than this" application.

Figure 11:
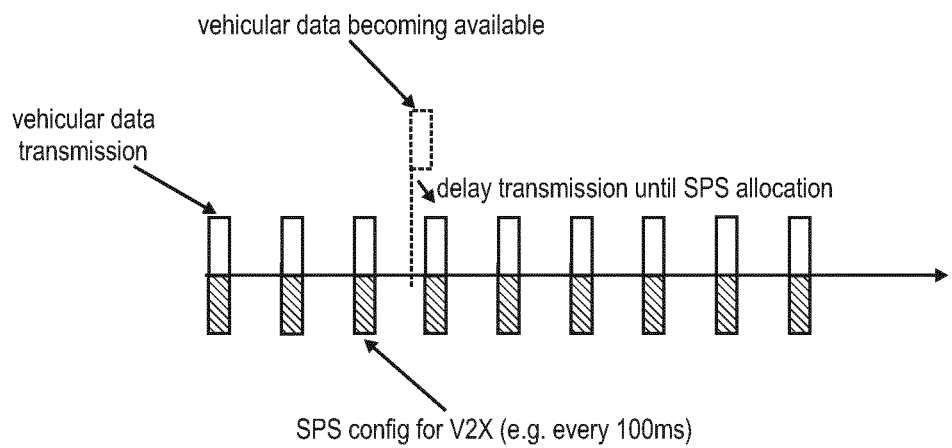
FIG. 11 illustrates a timing diagram to delay transmission of vehicular data until corresponding SPS resources according to an exemplary implementation.

This is illustrated in FIG. 11, which shows how vehicular data becomes available for transmission well before the SPS radio resources actually configured in said respect. As apparent from FIG. 11, the actual data transmission is however delayed until the corresponding next SPS resource.

The SPS resource configuration as discussed above is based on a concept called "Sensing". Sensing can be at least of two types: pure energy detection sensing and sensing based on content of, e.g., SA (PSCCH) signaling indicating how long the transmitter intends to hold on to the SPS resources. Energy based sensing (e.g., RSSI) can be performed on data resources (PSSCH) and/or on SA (PSCCH) resources.

On data resources Energy Sensing is done to check which data resources might be free. Then a UE (A) goes on to transmit SA including the information on selected resource information for data transmission (selected as a result of sensing). However, it is not clear if it can be sufficiently concluded that the said selected data resources will remain really free in the transmission occasion where the said UE (A) intends to transmit on, since some other UE(s) might have used the same data resources (PRBs) in the past according (but on the occasion where UE (A) performed sensing) to a different periodicity of their V2X application data arrival. So, in order to ensure that the transmission occasion where the said UE (A) intends to transmit on a particular resource, it must monitor on all occasions that might possibly reserve data transmission on this said particular resource at UE (A)'s intended transmission occasion. A good alternative would be then to assign periodicity (ies) to data resource pool such that UE(s) are only allowed to reserve the data resources (by transmitting on the same data resources) with a given periodicity (ies). E.g., if a UE wanted to transmit at time occasion 't' and the periodicity assigned to this transmission resource pool is 100 and 50 ms. then the said transmitter would either need to make a transmission on the said PRBs at t-100 and/or at t-50. In this example, a new UE (A) which intends to as well transmit at time occasion T, should first make the energy sensing at both t-100 and at t-50 on the said PRB. Then the UE (A) will go ahead with transmission at occasion T only if the sensing at both t-100 and at t-50 indicate these resources were not used at both these occasions.

The above scheme has two drawbacks: first, the energy sensing needs to be done on/across all the data resources (thereby expending UE battery) and second, there is no means for a transmitter (using certain PRB) to indicate to the other potential transmitters that it no more intends to use the same resource in the next transmission opportunity (i.e., at t+50 or t+100 etc.). To improve on these shortcomings, another embodiment is presented here as follows:

Sensing is performed on SA (PSCCH) resources such that a potential transmitter tries to make sense of the SA content itself. Sensing is performed to sense the possibility of 'future' data transmission. SA content indicates an optional periodicity value in addition to the information of the corresponding data resources (PRBs i.e., "Resource block assignment"), T-RPT etc. In this sense the indicated "periodicity" will indicate an offset either from the time of "this" SA transmission (or a specific repetition of SA), or from a particular data transmission (e.g., corresponding to the first '1' in the T-RPT) in "this" occasion of data transmission. This method avoids that the potential transmitter of a future transmission occasion must perform energy sensing on/across all the data resources—since from SA content (including periodicity) it will be clear that for a particular future occasion which all PRBs are definitely occupied. Then on the energy sensing needs to be performed on the "remaining" data PRBs of "this" occasion. In addition, this method allows possibility for a transmitter (using certain PRB) to indicate to the other potential transmitters that it no more intends to use the same resource in the next (future) transmission opportunity (i.e., at t+50 or t+100 etc.) by NOT including the "periodicity" information in the SA. The potential transmitter upon not finding any "periodicity" information in the SA concludes that the indicated data resources (PRBs i.e., "Resource block assignment") are not occupied by this (SA transmitter) UE at least.

Further, it is clear that long term reservation of let us say 5 or 10 future "occasions" is not so useful (but only for the NEXT occasion is sufficient; NEXT is like a Boolean information inside PSCCH) since:

SA (PSCCH) transmission itself can't be stopped to take care of a new incoming receiver later; and Reservations farther into the future run the risk of higher application uncertainty.

It should be noted that a UE which is already using/transmitting on particular data resource does not need to perform sensing continuously.

Therefore, the following enhancements in this respect are introduced:

Enhancement 1: SA (PSCCH) contains information on an "Periodicity" and "Next"; or Enhancement 2: Resource pools have specific periodicities associated with them and SA (PSCCH) contains "Next" indication.

Second Embodiment

Furthermore, for an efficient implementation of the V2X support, it is important that the vehicular UEs connect to the right network/cell which is also able to support V2X services (on Uu interface and/or PC5 interface) as well as the QoS requirements of such V2X services. In particular, the UE may initiate an RRC Connection on any eNB and will later in the ATTACH request message indicate that it intends to perform V2X traffic. The eNB will choose an MME, which however may not support V2X and will thus initiate the connection release. The MME that does not support V2X QOS may not be able to allocate any QCI since it does not understand the QOS requirements for V2X purpose. In absence of any QCI signaling from MME for a particular V2X bearer, eNB may fail to assign the radio bearer characteristics to the V2X logical channel—leading it to depend on legacy PPPP only for QOS fulfilment, which as said earlier are inadequate.

The eNodeB will thus have to choose another MME until an MME is found that indeed supports the V2X traffic request by the vehicular UE, or the UE will have to connect to another eNodeB until it finds an eNodeB which is indeed connected to an MME supporting V2X traffic. As apparent, this procedure, although possible, is not very efficient in terms of delay requirements and expenditure of radio resources. Consequently, a further second embodiment provides a mechanism that avoids these disadvantages, wherein this embodiment can be used in combination with the previously described first embodiment (and its variants and improvements) or may also be used independently therefrom.

In particular, eNodeBs that are connected to an MME that supports V2X traffic (and/or the corresponding QoS requirements for V2X traffic) may broadcast in its cell (or transmit same directly to UEs) a corresponding capability indication so as to assist vehicular UEs in selecting an appropriate eNodeB to connect to, namely one that is connected to an MME which supports V2X. Correspondingly, the vehicular UE that has to select among several eNodeBs to connect to or to camp on will select the one of the eNodeBs having broadcast (or transmitted) this V2X capability indication.

There are several different possibilities on how the V2X capability indication is transmitted by an eNodeB. One possibility is that the V2X capability indication is broadcast by the eNodeB in a particular SIB message, e.g., the SIB28. Correspondingly, when the vehicular UE receives such a SIB 28, it will learn that from that the network is capable of supporting V2X and the corresponding V2X quality of service.

Then, depending on whether a suitable D2D resource pool is already available, the vehicular UE, after connecting to the eNodeB, goes to RRC Connected, and then the network tells the UE whether Uu and/or PC5 is to be used. On the other hand, the system information broadcast (SIB28) already includes the Mode2-like V2V resources (i.e., at least one D2D radio resource pool) such that the UE may stay in RRC Idle and perform V2V Tx/Rx via the PC5 interface using radio resources selected from one of the radio resource pools. However, assuming that the PC5 interface would not provide sufficient QoS (e.g., reliability), the UE is still allowed to initiate an RRC Connection and ask for Uu resources (based on a new indication allowing the UE to initiate RRC Connection Establishment even if Mode 2 resources are provided for the V2X purpose).

The capability indication can be exemplarily implemented as a 2-bit indication, so as to also indicate whether Uu resources for V2V communication are provided or not:
  00: Empty (reserved)
  01: No Uu; Yes PC5
  10: Yes Uu; No PC5
  11: Both Yes As already mentioned before, the UE may indicate to the eNodeB its intention to use the PC5 interface and/or the UU interface to transmit V2X traffic data. This intention can be provided to the eNodeB in either the RRC Connection Request message or the RRC Connection Reconfiguration Complete message. In more detail, the RRC connection request message may include a new establishment cause or a new reserved LCID to indicate the intention of transmitting V2X messages. Alternatively, PRACH segregation (e.g., Preamble partitioning) could be used in said respect. On the other hand, the RRC Connection Reconfiguration Complete message may include a new cause or a new reserved LC ID to indicate the intention of transmitting V2X messages. Alternatively, a new MAC CE could be provided in said respect.

In any case, the eNodeB will thus learn about the intention of the vehicular UE and may select the right MME that supports V2X and route the corresponding messages (of S1 Connection Establishment) to that MME. Consequently, there is no delay for the UE to be able to start transmitting vehicular data and also no radio resources nor UE battery are wasted while trying to connect to a suitable eNodeB.

Further Embodiments

According to a first aspect, a vehicular mobile terminal is provided for transmitting vehicular data and other data to one or more receiving entities. A receiver of the vehicular mobile terminal receives an uplink grant from a radio base station controlling the cell to which the vehicular mobile terminal is attached, wherein the uplink grant indicates radio resources usable by the vehicular mobile terminal to transmit the vehicular data and/or the other data. A transmitter of the vehicular mobile terminal transmits the vehicular data and/or the other data using the radio resources indicated in the uplink grant. The vehicular mobile terminal is operative to handle the vehicular data and the other data separately from one another.

According to a second aspect which is provided in addition to the first aspect, the received uplink grant is a vehicular-data-specific uplink grant, indicating radio resources usable to be used by the vehicular mobile terminal to transmit the vehicular data. The transmitter transmits the vehicular data using the radio resources indicated in the vehicular-data-specific uplink grant. Optionally, the vehicular-data-specific uplink grant:
  is scrambled with a vehicular-data-specific identity of the vehicular mobile terminal; or
  comprises information to indicate that the indicated radio resources are to be used for transmission of the vehicular data, optionally the information being included in a separate field of the vehicular-data-specific uplink grant or being encoded as a codepoint of at least one field of the vehicular-data-specific uplink grant.

According to a third aspect which is provided in addition to the first aspect, the received uplink grant is a common uplink grant, indicating radio resources usable by the vehicular mobile terminal to transmit the vehicular data and the other data. A processor of the radio base station determines whether the radio resources indicated in the common uplink grant are to be used for transmitting the vehicular data and/or the other data. Optionally, the determination is based on priorities associated with logical channels carrying the other data and on priorities associated with vehicular-data logical channels carrying the vehicular data. The transmitter transmits the determined vehicular data and/or other data using the radio resources indicated in the common uplink grant. According to a fourth aspect which is provided in addition to one of the first to third aspects, a processor of the vehicular mobile terminal performs a first logical channel prioritization procedure for allocating the radio resources indicated in the uplink grant in a decreasing order of priorities to vehicular-data logical channels carrying the vehicular data and/or to logical channels carrying the other data, so as to generate a data packet carrying the vehicular data and/or the other data. The processor performs the first logical channel prioritization procedure:
  considering only vehicular logical channels carrying the vehicular data in case the radio resources indicated in the received uplink grant are to be used for transmitting the vehicular data so as to generate a data packet carrying the vehicular data;
  considering only logical channels carrying the other data in case the radio resources indicated in the received uplink grant are to be used for transmitting the other data so as to generate a data packet carrying the other data; and considering both the vehicular logical channels carrying the vehicular data as well as the logical channels carrying the other data in case the radio resources indicated in the received uplink grant are to be used for transmitting the other data and the vehicular data so as to generate a data packet carrying the vehicular data and the other data.

According to a fifth aspect in addition to one of the first to fourth aspects, at least one vehicular-data logical channel is configured in the vehicular mobile terminal to carry the vehicular data. Each vehicular-data logical channel is associated with a priority depending on the vehicular data carried thereby, wherein the priority of the vehicular-data logical channels is different from priorities associated with logical channels carrying the other data. Optionally, some of the vehicular-data logical channels have a higher priority than logical channels carrying the other data. Optionally, only vehicular-data logical channels carrying safety messages have a higher priority than logical channels carrying the other data.

According to a sixth aspect in addition to one of the first to fifth aspects, a processor of the vehicular mobile terminal generates a buffer status report indicating the amount of the vehicular data available for transmission in the vehicular mobile terminal and separately indicating the amount of the other data available for transmission in the vehicular mobile terminal. Optionally, vehicular-data logical channels, carrying the vehicular data, are assigned to at least one vehicular-data logical channel group, and the buffer status report is generated to indicate the amount of vehicular data available for transmission from all the vehicular-data logical channels of the vehicular-data logical channel group. Optionally, the assignment of the vehicular-data logical channels to the at least one vehicular-data logical channel group is controlled by the radio base station.

According to a seventh aspect in addition to one of the first to sixth aspects, the vehicular data and the other data are to be transmitted via a sidelink radio interface to other vehicular entities. The vehicular mobile terminal is configured with at least one radio resource pool, each radio resource pool indicating radio resources usable for performing a transmission via the sidelink radio interface. The processor prioritizes the vehicular data or the other data depending on their content and to select radio resources from one of the radio resource pools for transmitting the prioritized vehicular data or other data.

According to an eighth aspect in addition to one of the first to seventh aspects, the transmitter transmits a vehicular-data scheduling request to the radio base station so as to request radio resources, wherein the vehicular-data scheduling request indicates that the requested radio resources are to be used to transmit vehicular data. Optionally, the receiver receives a second uplink grant from the radio base station in response to the transmitted vehicular-data scheduling request. The transmitter transmits the vehicular data using the radio resources indicated in the second uplink grant.

According to a ninth aspect in addition to one of the first to eighth aspects, the vehicular data and the other data are to be transmitted via a first radio interface to the radio base station, and/or via a sidelink radio interface to other vehicular entities.

According to a tenth aspect in addition to one of the first to ninth aspects, the receiver receives from at least one among a plurality of radio base stations a vehicular-data capability indication, indicating that the radio base station is connected to a core network entity capable of supporting vehicular data traffic and corresponding quality of service requirements. A processor of the vehicular mobile terminal selects one of the at least one radio base stations from which the vehicular-data capability indication is received so as to attach to the one radio base station. Optionally, the vehicular-data capability indication is broadcast by a radio base station as part of system information. Optionally, the vehicular-data capability indication further indicates whether vehicular data traffic is supported via a first radio interface between the vehicular mobile terminal and the radio base station and/or via a sidelink radio interface between the vehicular mobile terminal and other vehicular entities.

According to a eleventh aspect in addition to the tenth aspect, the transmitter indicates that the vehicular mobile terminal intends to transmit vehicular data when attaching to the one radio base station. Optionally, the indication of the intention to transmit vehicular data is comprised in either a connection request message or a connection reconfiguration complete message.

According to a twelfth aspect, a radio base station is provided for controlling a vehicular mobile terminal which transmits vehicular data and other data to one or more receiving entities. The radio base station comprises a transmitter that transmits an uplink grant to the vehicular mobile terminal, wherein the uplink grant indicates radio resources usable by the vehicular mobile terminal to transmit the vehicular data and/or the other data. A receiver of the radio base station receives the vehicular data and/or the other data on the radio resources indicated in the uplink grant. The radio base station is operative to control the vehicular mobile terminal such that the vehicular data is handled separately from the other data.

According to a thirteenth aspect in addition to the twelfth aspect, the received uplink grant is a vehicular-data-specific uplink grant, indicating radio resources usable by the vehicular mobile terminal to transmit the vehicular data. Optionally, the vehicular-data-specific uplink grant:

is scrambled by a processor of the radio base station with a vehicular-data-specific identity of the vehicular mobile terminal, or comprises information to indicate that the indicated radio resources are to be used for transmission of the vehicular data, optionally the information being included in a separate field of the vehicular-data-specific uplink grant or being encoded as a codepoint of at least one field of the vehicular-data-specific uplink grant.

According to a fourteenth aspect in addition to one of the twelfth or thirteenth aspect, at least one vehicular-data logical channel is configured in the vehicular mobile terminal to carry the vehicular data. Each vehicular-data logical channel is associated with a priority depending on the vehicular data carried thereby, wherein the priority of the vehicular-data logical channels is different from priorities associated with logical channels carrying the other data. Optionally, some of the vehicular-data logical channels have a higher priority than logical channels carrying the other data. Optionally, only vehicular-data logical channels carrying safety messages have a higher priority than logical channels carrying the other data.

According to a fifteenth aspect in addition to one of the twelfth to fourteenth aspects, the receiver receives a buffer status report indicating the amount of the vehicular data available for transmission in the vehicular mobile terminal and separately indicating the amount of the other data available for transmission in the vehicular mobile terminal.

Optionally, vehicular-data logical channels, carrying the vehicular data, are assigned to at least one vehicular-data logical channel group, and the buffer status report indicates the amount of vehicular data available for transmission from all the vehicular-data logical channels of the vehicular-data logical channel group. Optionally, the assignment of the vehicular-data logical channels to the at least one vehicular-data logical channel group is controlled by the radio base station.

According to a sixteenth aspect in addition to one of the twelfth to fifteenth aspects, the receiver receives a vehicular-data scheduling request from the vehicular mobile terminals that requests radio resources. The vehicular-data scheduling request indicates that the requested radio resources are to be used to transmit vehicular data. Optionally, the transmitter transmits a second uplink grant to the vehicular mobile terminal in response to the received vehicular-data scheduling request, indicating radio resources to be used for transmitting the vehicular data and wherein the receiver operative to receive the vehicular data using the radio resources indicated in the second uplink grant.

According to a seventeenth aspect in addition to one of the twelfth to sixteenth aspects, the vehicular data and the other data are to be transmitted via a first radio interface to the radio base station and/or via a sidelink radio interface to other vehicular entities.

According to a eighteenth aspect in addition to one of the twelfth to seventeenth aspects, the transmitter transmits a vehicular-data capability indication, indicating that the radio base station is connected to a core network entity capable of supporting vehicular data traffic and corresponding quality of service requirements, such that the vehicular mobile terminal can select a radio base station from which the vehicular-data capability indication is received so as to attach to the one radio base station. Optionally, the vehicular-data capability indication is broadcast by a radio base station as part of system information. Optionally, the vehicular-data capability indication further indicates whether vehicular data traffic is supported via a first radio interface between the vehicular mobile terminal and the radio base station and/or via a sidelink radio interface between the vehicular mobile terminal and other vehicular entities.

According to a nineteenth aspect in addition to the eighteenth aspect, the receiver receives an indication that the vehicular mobile terminal intends to transmit vehicular data when attaching to the radio base station. Optionally, the indication of the intention to transmit vehicular data is comprised in a connection request message or a connection reconfiguration complete message.

According to a twentieth aspect, a method for a vehicular mobile terminal is provided to transmit vehicular data and other data to one or more receiving entities. The method comprising the step of receiving an uplink grant from a radio base station controlling the cell to which the vehicular mobile terminal is attached, wherein the uplink grant indicates radio resources usable by the vehicular mobile terminal to transmit the vehicular data and/or the other data. A further step comprises transmitting the vehicular data and/or the other data using the radio resources indicated in the uplink grant. The vehicular mobile terminal handles the vehicular data and the other data separately from one another.

Hardware and Software Implementation of the Present Disclosure

Other exemplary embodiments relate to the implementation of the above described various embodiments using hardware, software, or software in cooperation with hardware. In this connection a user terminal (mobile terminal) is provided. The user terminal is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicular mobile terminal for transmitting vehicular data and other data to one or more receiving entities, wherein the vehicular mobile terminal comprises:

a receiver operative to receive an uplink grant from a radio base station controlling a cell to which the vehicular mobile terminal is attached, wherein the uplink grant indicates radio resources usable by the vehicular mobile terminal to transmit at least one of the vehicular data or the other data; and a transmitter operative to transmit the at least one of the vehicular data or the other data using the radio resources indicated in the uplink grant, wherein the vehicular mobile terminal is operative to handle the vehicular data and the other data separately from one another, wherein a processor of the vehicular mobile terminal is operative to perform a first logical channel prioritization procedure for allocating the radio resources indicated in the uplink grant in a decreasing order of priorities to at least one of vehicular-data logical channels carrying the vehicular data or logical channels carrying the other data, so as to generate a data packet carrying the at least one of the vehicular data or the other data, and wherein the processor is operative to perform the first logical channel prioritization procedure:
considering only vehicular logical channels carrying the vehicular data in case the radio resources indicated in the received uplink grant are to be used for transmitting the vehicular data so as to generate a data packet carrying the vehicular data;
considering only logical channels carrying the other data in case the radio resources indicated in the received uplink grant are to be used for transmitting the other data so as to generate a data packet carrying the other data; and
considering both the vehicular logical channels carrying the vehicular data as well as the logical channels carrying the other data in case the radio resources indicated in the received uplink grant are to be used for transmitting the other data and the vehicular data so as to generate a data packet carrying the vehicular data and the other data.

2. The vehicular mobile terminal according to claim 1, wherein the received uplink grant is a vehicular-data-specific uplink grant, indicating radio resources to be used by the vehicular mobile terminal to transmit the vehicular data, and wherein the transmitter is operative to transmit the vehicular data using the radio resources indicated in the vehicular-data-specific uplink grant, wherein the vehicular-data-specific uplink grant:
is scrambled with a vehicular-data-specific identity of the vehicular mobile terminal; or
comprises information to indicate that the radio resources indicated in the uplink grant are to be used for transmission of the vehicular data, the information being included in a separate field of the vehicular-data-specific uplink grant or being encoded as a codepoint of at least one field of the vehicular-data-specific uplink grant.

3. The vehicular mobile terminal according to claim 1, wherein the received uplink grant is a common uplink grant, indicating radio resources usable by the vehicular mobile terminal to transmit the vehicular data and the other data, wherein a processor of the radio base station is operative to determine whether the radio resources indicated in the common uplink grant are to be used for transmitting the at least one of the vehicular data or the other data, wherein the determination is based on priorities associated with logical channels carrying the other data and on priorities associated with vehicular-data logical channels carrying the vehicular data, and wherein the transmitter is operative to transmit the at least one of the vehicular data or other data using the radio resources indicated in the common uplink grant.

4. The vehicular mobile terminal according to claim 1, wherein at least one vehicular-data logical channel is configured in the vehicular mobile terminal to carry the vehicular data, and wherein each vehicular-data logical channel is associated with a priority depending on the vehicular data carried thereby, wherein the priority of the vehicular-data logical channels is different from priorities associated with logical channels carrying the other data, and wherein some of the vehicular-data logical channels have a higher priority than logical channels carrying the other data, wherein only vehicular-data logical channels carrying safety messages have a higher priority than logical channels carrying the other data.

5. The vehicular mobile terminal according to claim 1, wherein the processor is operative to generate a buffer status report indicating an amount of the vehicular data available for transmission in the vehicular mobile terminal and separately indicating the amount of the other data available for transmission in the vehicular mobile terminal, wherein vehicular-data logical channels, carrying the vehicular data, are assigned to at least one vehicular-data logical channel group, and the buffer status report is generated to indicate the amount of vehicular data available for transmission from all of the vehicular-data logical channels of the vehicular-data logical channel group, wherein the assignment of the vehicular-data logical channels to the at least one vehicular-data logical channel group is controlled by the radio base station.

6. The vehicular mobile terminal according to claim 1, wherein the vehicular data and the other data are to be transmitted via a sidelink radio interface to other vehicular entities, wherein the vehicular mobile terminal is configured with at least one radio resource pool, each radio resource pool indicating radio resources usable for performing a transmission via the sidelink radio interface, wherein the processor is operative to prioritize the vehicular data or the other data depending on their content, and to select radio resources from one of the radio resource pools for transmitting the prioritized vehicular data or other data.

7. The vehicular mobile terminal according to claim 1, wherein the transmitter is operative to transmit a vehicular-data scheduling request to the radio base station so as to request radio resources, wherein the vehicular-data scheduling request indicates that the requested radio resources are to be used to transmit vehicular data, wherein the receiver is operative to receive a second uplink grant from the radio base station in response to the transmitted vehicular-data scheduling request, and wherein the transmitter is operative to transmit the vehicular data using the radio resources indicated in the second uplink grant.

8. The vehicular mobile terminal according to claim 1, wherein the vehicular data and the other data are to be transmitted via at least one of a first radio interface to the radio base station or a sidelink radio interface to other vehicular entities.

9. The vehicular mobile terminal according to claim 1,
wherein the receiver is operative to receive, from at least one radio base station among a plurality of radio base stations, a vehicular-data capability indication, indicating that the radio base station is connected to a core network entity capable of supporting vehicular data traffic and corresponding quality of service requirements,
wherein the processor is operative to select one of the at least one radio base station among the plurality of radio base stations from which the vehicular-data capability indication is received so as to attach to the at least one radio base station among the plurality of radio base stations, and
wherein the vehicular-data capability indication is broadcast by the at least one among the plurality of radio base stations as part of system information, and
wherein the vehicular-data capability indication further indicates whether vehicular data traffic is supported by at least one of a first radio interface between the vehicular mobile terminal and the radio base station or a sidelink radio interface between the vehicular mobile terminal and other vehicular entities.

10. The vehicular mobile terminal according to claim 9, wherein the transmitter is operative to transmit an indication that the vehicular mobile terminal intends to transmit vehicular data when attaching to the at least one radio base station among the plurality of radio base stations, and
wherein the indication that the vehicular mobile terminal intends to transmit vehicular data is comprised in a connection request message or a connection reconfiguration complete message.

11. A radio base station for controlling a vehicular mobile terminal which transmits vehicular data and other data to one or more receiving entities, wherein the radio base station comprises:
a transmitter operative to transmit an uplink grant to the vehicular mobile terminal, wherein the uplink grant indicates radio resources usable by the vehicular mobile terminal to transmit at least one of the vehicular data or the other data; and
a receiver operative to receive the at least one of the vehicular data or the other data on the radio resources indicated in the uplink grant,
wherein the radio base station is operative to control the vehicular mobile terminal such that the vehicular data is handled separately from the other data,
wherein vehicular-data logical channels are configured in the vehicular mobile terminal to carry the vehicular data, each of the vehicular-data logical channels is associated with a priority depending on the vehicular data carried thereby, and priorities of the vehicular-data logical channels are different from priorities associated with logical channels carrying the other data, and
wherein some of the vehicular-data logical channels have a higher priority than the logical channels carrying the other data, and only vehicular-data logical channels carrying safety messages have a higher priority than the logical channels carrying the other data.

12. The radio base station according to claim 11, wherein the received uplink grant is a vehicular-data-specific uplink grant, indicating radio resources usable by the vehicular mobile terminal to transmit the vehicular data, and
wherein the vehicular-data-specific uplink grant:
is scrambled by a processor of the radio base station with a vehicular-data-specific identity of the vehicular mobile terminal; or
comprises information to indicate that the radio resources indicated in the uplink grant are to be used for transmission of the vehicular data, the information being included in a separate field of the vehicular-data-specific uplink grant or being encoded as a codepoint of at least one field of the vehicular-data-specific uplink grant.

13. The radio base station according to claim 11,
wherein the receiver is operative to receive a buffer status report indicating an amount of the vehicular data available for transmission in the vehicular mobile terminal and separately indicating the amount of the other data available for transmission in the vehicular mobile terminal,
wherein the vehicular-data logical channels are assigned to at least one vehicular-data logical channel group, and the buffer status report indicates the amount of vehicular data available for transmission from all of the vehicular-data logical channels of the vehicular-data logical channel group,
wherein the assignment of the vehicular-data logical channels to the at least one vehicular-data logical channel group is controlled by the radio base station.

14. The radio base station according to claim 11,
wherein the receiver is operative to receive a vehicular-data scheduling request from the vehicular mobile terminal,
wherein the vehicular-data scheduling request requests radio resources and indicates that the requested radio resources are to be used to transmit vehicular data,
wherein the transmitter is operative to transmit a second uplink grant to the vehicular mobile terminal in response to the received vehicular-data scheduling request, the second uplink grant indicating radio resources to be used for transmitting the vehicular data, and
wherein the receiver operative to receive the vehicular data using the radio resources indicated in the second uplink grant.

15. The radio base station according to claim 11, wherein the vehicular data and the other data are to be transmitted via at least one of a first radio interface to the radio base station or a sidelink radio interface to other vehicular entities.

16. The radio base station according to claim 11,
wherein the transmitter transmits a vehicular-data capability indication, indicating that the radio base station is connected to a core network entity capable of supporting vehicular data traffic and corresponding quality of service requirements, such that the vehicular mobile terminal can select a radio base station from which the vehicular-data capability indication is received so as to attach to the selected radio base station, and
wherein the vehicular-data capability indication is broadcast by a radio base station as part of system information, and
wherein the vehicular-data capability indication further indicates whether vehicular data traffic is supported by at least one of a first radio interface between the vehicular mobile terminal and the radio base station or a sidelink radio interface between the vehicular mobile terminal and other vehicular entities.

17. The radio base station according to claim 16, wherein the receiver is operative to receive an indication that the vehicular mobile terminal intends to transmit vehicular data when attaching to the radio base station, and
wherein the indication that the vehicular mobile terminal intends to transmit vehicular data is comprised in at least one of a connection request message or a connection reconfiguration complete message.

18. A method for a vehicular mobile terminal to transmit vehicular data and other data to one or more receiving entities, the method comprising:

receiving an uplink grant from a radio base station controlling a cell to which the vehicular mobile terminal is attached, wherein the uplink grant indicates radio resources usable by the vehicular mobile terminal to transmit at least one of the vehicular data or the other data; and transmitting the at least one of the vehicular data or the other data using the radio resources indicated in the uplink grant, wherein the vehicular mobile terminal handles the vehicular data and the other data separately from one another, wherein the vehicular mobile terminal performs a first logical channel prioritization procedure for allocating the radio resources indicated in the uplink grant in a decreasing order of priorities to at least one of vehicular-data logical channels carrying the vehicular data or logical channels carrying the other data, so as to generate a data packet carrying the at least one of the vehicular data or the other data, and wherein the vehicular mobile terminal performs the first logical channel prioritization procedure:

considering only vehicular logical channels carrying the vehicular data in case the radio resources indicated in the received uplink grant are to be used for transmitting the vehicular data so as to generate a data packet carrying the vehicular data;

considering only logical channels carrying the other data in case the radio resources indicated in the received uplink grant are to be used for transmitting the other data so as to generate a data packet carrying the other data; and considering both the vehicular logical channels carrying the vehicular data as well as the logical channels carrying the other data in case the radio resources indicated in the received uplink grant are to be used for transmitting the other data and the vehicular data so as to generate a data packet carrying the vehicular data and the other data.

* * * * *